(12) United States Patent
Doi et al.

(10) Patent No.: US 10,769,506 B2
(45) Date of Patent: Sep. 8, 2020

(54) IMAGE PROCESSING APPARATUS AND IMAGE PROCESSING METHOD QUANTIZING GRADATION DATA TO HAVE A SMALLER NUMBER OF GRADATIONS

(71) Applicant: CANON KABUSHIKI KAISHA, Tokyo (JP)

(72) Inventors: Tsukasa Doi, Tokyo (JP); Hirokazu Tanaka, Inagi (JP); Hisashi Ishikawa, Urayasu (JP); Shoei Moribe, Kawasaki (JP); Yusuke Yamamoto, Tokyo (JP); Shigeo Kodama, Tokyo (JP); Yuta Ikeshima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/519,731

(22) Filed: Jul. 23, 2019

(65) Prior Publication Data
US 2020/0042840 A1   Feb. 6, 2020

(30) Foreign Application Priority Data
Aug. 1, 2018   (JP) .................................. 2018-145330

(51) Int. Cl.
*G06K 15/00* (2006.01)
*G06K 15/02* (2006.01)
*G06K 15/10* (2006.01)

(52) U.S. Cl.
CPC ......... *G06K 15/188* (2013.01); *G06K 15/102* (2013.01); *G06K 15/1823* (2013.01); *G06K 15/1877* (2013.01)

(58) Field of Classification Search
None
See application file for complete search history.

(56) References Cited

U.S. PATENT DOCUMENTS

| 6,330,075 | B1 | 12/2001 | Ishikawa |
| 6,967,745 | B1 | 11/2005 | Konno et al. |
| 8,009,327 | B2 | 8/2011 | Ishikawa |

(Continued)

FOREIGN PATENT DOCUMENTS

JP   2017-38127   2/2017

OTHER PUBLICATIONS

U.S. Appl. No. 16/519,680, filed Jul. 23, 2019, by Tsukasa Doi.

*Primary Examiner* — Dung D Tran
(74) *Attorney, Agent, or Firm* — Venable LLP

(57) ABSTRACT

When a sum of a first gradation data for a first color and a second gradation data for a second color is greater than the maximum value of thresholds of a first threshold matrix, a generation unit generates a first overlapping gradation data and second overlapping gradation data by dividing a value obtained by subtracting the maximum value from the sum. Further, the generation unit generates a first quantization data based on a result of comparing the first overlapping gradation data with the second threshold or a result of comparing a difference between the first gradation data and the first overlapping gradation data with the first threshold, and generates a second quantization data based on a result of comparing the second overlapping gradation data with the first threshold or a result of comparing a difference between the second gradation data and the second overlapping gradation data with the second threshold.

19 Claims, 29 Drawing Sheets

(56) References Cited

U.S. PATENT DOCUMENTS

| | | | |
|---|---|---|---|
| 8,947,735 B2 | 2/2015 | Kodama | |
| 9,064,202 B2 | 6/2015 | Tanaka | |
| 9,636,937 B2 * | 5/2017 | Ikeda | B41J 2/2132 |
| 9,888,149 B2 | 2/2018 | Suzuki | |
| 10,043,118 B2 * | 8/2018 | Sumi | G06K 15/1822 |
| 10,165,153 B2 | 12/2018 | Kajiwara | |
| 10,225,439 B2 | 3/2019 | Suzuki | |
| 2004/0051905 A1 * | 3/2004 | Yamada | H04N 1/52 358/3.03 |
| 2016/0241740 A1 * | 8/2016 | Nakagawa | H04N 1/40087 |
| 2016/0248933 A1 * | 8/2016 | Yamada | H04N 1/405 |
| 2017/0041508 A1 * | 2/2017 | Kajiwara | G06K 15/1872 |
| 2018/0020125 A1 * | 1/2018 | Kajiwara | H04N 1/6027 |
| 2018/0096234 A1 * | 4/2018 | Yamada | G06K 15/1881 |
| 2018/0218246 A1 * | 8/2018 | Kakutani | G06K 15/1881 |
| 2019/0052775 A1 * | 2/2019 | Suzuki | H04N 1/608 |

* cited by examiner

| 0 | 6 | 13 | 8 |
|---|---|---|---|
| 14 | 11 | 4 | 1 |
| 7 | 2 | 9 | 15 |
| 10 | 12 | 3 | 5 |

FIRST THRESHOLD MATRIX

| 15 | 9 | 2 | 7 |
|---|---|---|---|
| 1 | 4 | 11 | 14 |
| 8 | 13 | 6 | 0 |
| 5 | 3 | 12 | 10 |

SECOND THRESHOLD MATRIX

| A | B | C | D |
|---|---|---|---|
| E | F | G | H |
| I | J | K | L |
| M | N | O | P |

COORDINATES

FIG.7

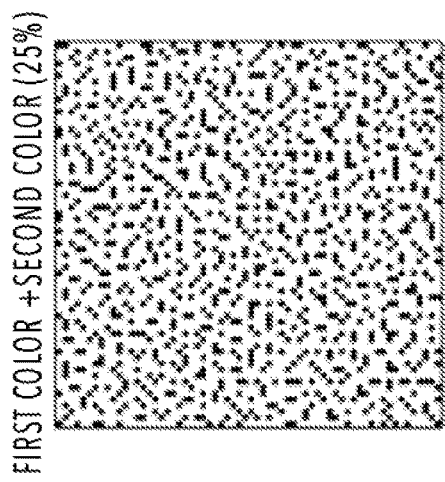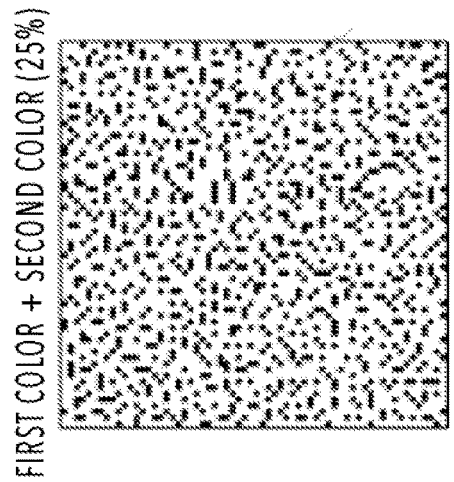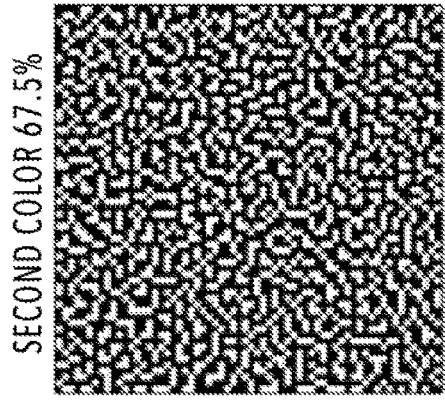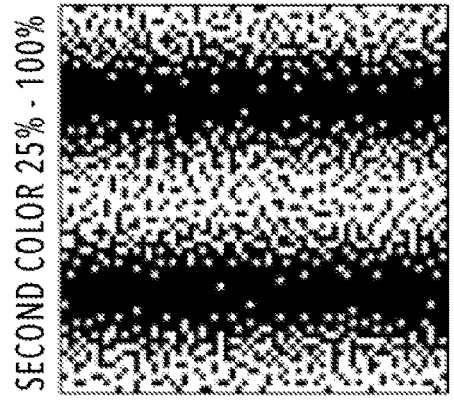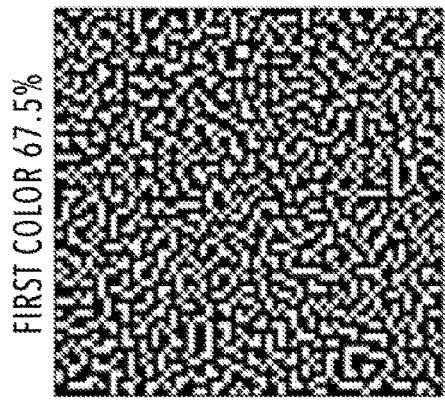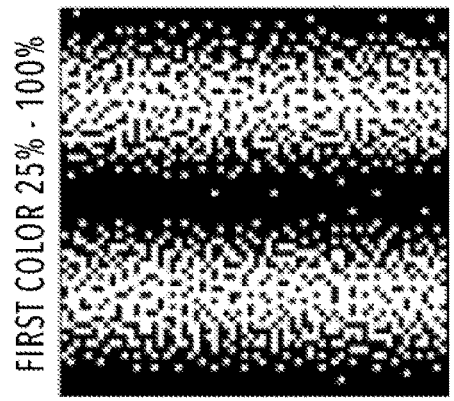
FIG.15A  FIG.15B

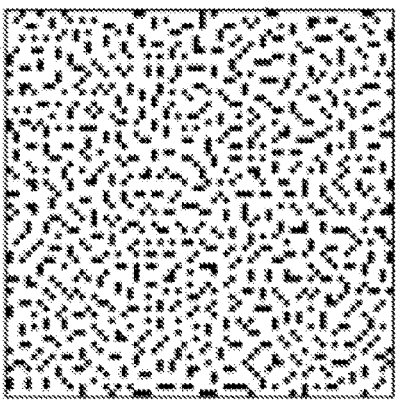
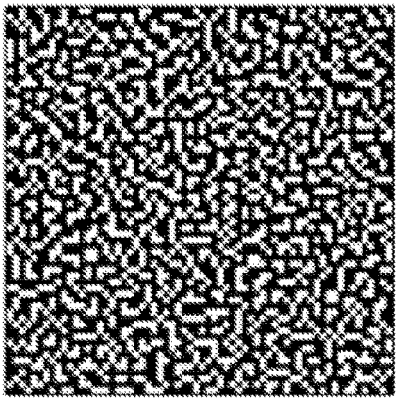
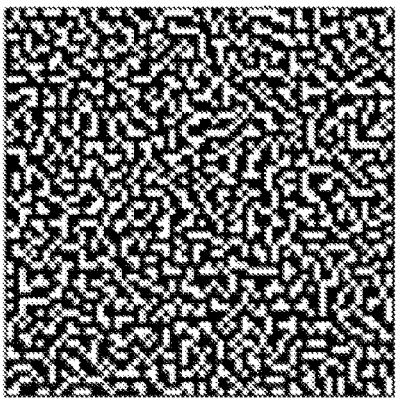
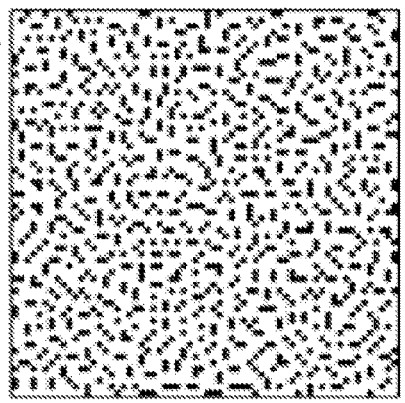
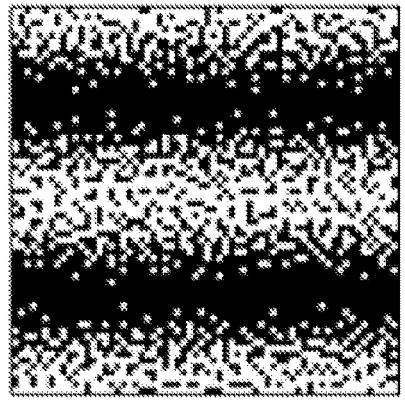
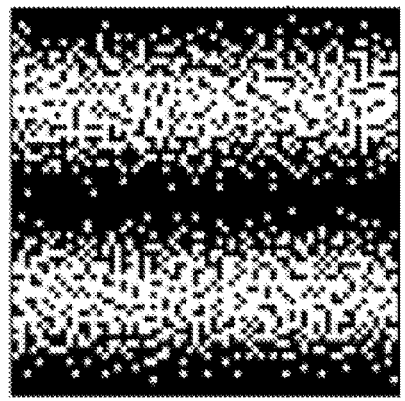
FIG. 16A
FIG. 16B

| MAGNITUDE OF BaseLv1 AND BaseLv2 | Comp1A | Comp1B | Comp2A | Comp2B |
|---|---|---|---|---|
| BaseLv1 = BaseLv2 | In' 1 | In' 2 | In' 1 | In' 2 |
| BaseLv1 < BaseLv2 | In' 1 | 100% | 0% | In' 2 |
| BaseLv1 > BaseLv2 | In' 1 | 0% | 100% | In' 2 |

FIG.22

| MAGNITUDE OF BaseLv1 AND BaseLv2 | Comp1A | Comp1B | Comp2A | Comp2B |
|---|---|---|---|---|
| BaseLv1 = BaseLv2 | In' 1 | In' 2 | In' 1 | In' 2 |
| BaseLv1 ≠ BaseLv2 | In' 1 | 0% | 0% | In' 2 |

FIG.25

IMAGE PROCESSING APPARATUS AND IMAGE PROCESSING METHOD QUANTIZING GRADATION DATA TO HAVE A SMALLER NUMBER OF GRADATIONS

BACKGROUND OF THE INVENTION

Field of the Invention

The present invention relates to an image processing apparatus and an image processing method for forming an image on a printing medium by quantization processing.

Description of the Related Art

In a case of using a half-toning method to print an image, it is necessary to quantize multi-valued image data. As a quantization method used in this case, an error-diffusion method and a dither method have been known. In particular, the dither method that compares a threshold stored in advance with a gradation value of multi-valued data to determine a quantization level has a smaller processing load than the error-diffusion method, and thus is used in many image processing apparatuses. Particularly, the dispersibility of dots in a low-gradation area may be issue in the dither method, and it has been known that good dot dispersibility can be obtained by using a threshold matrix having blue noise characteristics.

FIGS. 28A to 28C are diagrams for describing the dither processing using the threshold matrix having blue noise characteristics. FIG. 28A shows an image data example inputted to a 16×16 pixel area. This shows a state in which gradation values "36" are inputted to all the pixels. FIG. 28B shows a threshold matrix that is prepared for the abovementioned 16×16 pixel area. Any one of thresholds 0 to 255 is associated with each pixel. In the dither method, if the gradation value indicated by multi-valued image data is greater than the threshold, the pixel is specified as "1" representing that a dot is printed. On the other hand, if the gradation value indicated by multi-valued image data is equal to or smaller than the threshold, the pixel is specified as "0" representing that a dot is not printed.

FIG. 28C shows a result of quantization by the abovementioned dither method. The pixels of "1" representing printing are in black, and the pixels of "0" representing not-printing are in white. Distribution of the pixels of "1" representing printing as shown in FIG. 28C depends on arrangement of the thresholds in the threshold matrix. Even in the case of inputting the multi-valued data of equal values to a predetermined area as shown in FIG. 28A, use of the threshold matrix shown in FIG. 28B having blue noise characteristics allows the pixels of "1" representing printing to be arranged with high dispersibility as shown in FIG. 28C.

FIGS. 29A and 29B are diagrams that respectively show blue noise characteristics and visual transfer function of human (VTF) in a distance of conspicuous vision of 300 mm. In both the diagrams, the horizontal axis represents a frequency (cycles/mm) that is lower in the left side and higher in the right side of the graph, while the vertical axis represents an intensity (power) corresponding to the frequency.

According to FIG. 29A, blue noise characteristics have features of suppressed low frequency components, rapid rise, and flat high frequency components. A frequency fg at a peak of the rapid rise is called a principle frequency. Meanwhile, for the visual transfer function of human (VTF) shown in FIG. 29B, an approximate expression of Dooley as (Expression 1) is used for example. In (Expression 1), l represents an observation distance, and f represents a frequency:

$$VTF=5.05\times\exp(-0.138\times\pi lf/180)\times(1-\exp(0.1\times\pi lf/180))$$ (Expression 1).

As can be seen in FIG. 29B, the visual properties of human have high sensitivity in a low frequency area and have low sensitivity in a high frequency area. That is, low frequency components are visually perceivable but high frequency components are visually unperceivable. Blue noise characteristics are made in the light of such visual transfer function, and almost no power is applied to the low frequency area with high sensitivity (visually perceivable) while applying power to the high frequency area with low sensitivity (visually unperceivable). Consequently, in a case where a human sees an image on which the quantization processing is performed with the threshold matrix having blue noise characteristics, uneven dispersion and periodicity of the dots are hardly perceived and the image is recognized as a comfortable image.

On the other hand, Japanese Patent Laid-Open No. 2017-38127 discloses a dither method for solving a situation in which the dispersibility is deteriorated and the granularity is conspicuous in printing of an image with multiple color materials (i.e., mixed-color) although good dispersibility can be obtained with each color material (i.e., single-color). Specifically, there is disclosed a method that prepares a common dither matrix having good dispersibility as shown in FIG. 28B and performs the quantization processing while shifting thresholds color by color for multiple colors. With this quantization processing, dots of different colors in a low-gradation area are printed mutually exclusively with high dispersibility, and thus it is possible to obtain a mixed-color image which is smooth with no conspicuous granularity.

It should be noted that the above-described processing has a tendency that the dispersibility of second and following colors, which require the shifting of thresholds or input values, becomes inevitably lower than the dispersibility of a first color, which requires no shifting of thresholds or input values. For this reason, it is preferred that the first color and the second color in the order of colors to be processed be set in order from a color material with lowest lightness and highest dot power. However, in a case where there are color materials having almost the same dot powers such as cyan dots and magenta dots, granularity of magenta becomes conspicuous if cyan is set as the first color, and granularity of cyan becomes conspicuous if magenta is set as the first color.

In view of such circumstances, Japanese Patent Laid-Open No. 2017-38127 discloses a method of performing processing by using different threshold matrixes for the two colors having high dot powers. Specifically, the quantization processing is performed on each of color groups, which include a color group that uses the same threshold matrix as cyan and thresholds are shifted with cyan set as the first color and a color group that uses the same threshold matrix as magenta and thresholds are shifted with magenta set as the first color. In this way, it is possible to output an image in which multiple colors of dots are mixed without conspicuous granularity while maintaining high dispersibility of the single-color cyan dots and high dispersibility of the single-color magenta dots.

However, even in a case where both the threshold matrix for cyan and the threshold matrix for magenta have blue noise characteristics, the arrangement of overlapping dots of cyan and magenta printed according to the threshold matrixes does not have blue noise characteristics. Additionally, since such overlapping dots have higher dot powers than the single-color cyan dots and the single-color magenta dots, granularity of the overlapping dots may be unfavorably conspicuous in the highly dispersed cyan dots and magenta dots. That is, even with the technique of Japanese Patent Laid-Open No. 2017-38127, an image in which overlapping dots with high dot powers are mixed may have conspicuous granularity.

SUMMARY OF THE INVENTION

The present invention is made to solve the above-described problems. In this view, the object of the present invention is to provide an image processing apparatus that enables printing of an image with no conspicuous granularity in a configuration of printing with dots of multiple color materials mixed on a printing medium.

In a first aspect of the present invention, there is provided an image processing apparatus, comprising: a gradation data obtainment unit configured to obtain first gradation data corresponding to a gradation value of a first color and second gradation data corresponding to a gradation value of a second color for a processing-target pixel; a threshold obtainment unit configured to obtain a first threshold for the processing-target pixel from a first threshold matrix including a plurality of arrayed thresholds for pixels and obtain a second threshold for the processing-target pixel from a second threshold matrix in which the thresholds for the pixels are arrayed at such pixel positions that order of the pixel positions is inverse to order of pixel positions in the first threshold matrix in a case where the pixel positions are arranged in ascending order of the thresholds; and a generation unit configured to generate first quantization data and second quantization data that have a smaller number of gradations than the number of gradations of the first gradation data and the second gradation data based on the first threshold, the second threshold, the first gradation data, and the second gradation data: the image processing apparatus performing image processing to print a color material of the first color based on the first quantization data and to print a color material of the second color based on the second quantization data, wherein the generation unit, in a case where a sum of the first gradation data and the second gradation data is equal to or smaller than the maximum value of the thresholds arrayed in the first threshold matrix, generates the first quantization data based on a result of comparing the first gradation data with the first threshold and generates the second quantization data based on a result of comparing the second gradation data with the second threshold, and in a case where the sum is greater than the maximum value, generates first overlapping gradation data and second overlapping gradation data by dividing a value that is obtained by subtracting the maximum value from the sum into two, generates the first quantization data based on a result of comparing the first overlapping gradation data with the second threshold or a result of comparing a difference between the first gradation data and the first overlapping gradation data with the first threshold, and generates the second quantization data based on a result of comparing the second overlapping gradation data with the first threshold or a result of comparing a difference between the second gradation data and the second overlapping gradation data with the second threshold.

In a second aspect of the present invention, there is provided an image processing apparatus, comprising: a gradation data obtainment unit configured to obtain first gradation data corresponding to a gradation value of a first color and second gradation data corresponding to a gradation value of a second color for a processing-target pixel; a threshold obtainment unit configured to obtain a first threshold for the processing-target pixel from a first threshold matrix including a plurality of arrayed thresholds for pixels and obtain a second threshold for the processing-target pixel from a second threshold matrix in which the thresholds for the pixels are arrayed at such pixel positions that order of the pixel positions is inverse to order of pixel positions in the first threshold matrix in a case where the pixel positions are arranged in ascending order of the thresholds; and a generation unit configured to generate first quantization data and second quantization data that have a smaller number of gradations than the number of gradations of the first gradation data and the second gradation data based on the first threshold, the second threshold, the first gradation data, and the second gradation data: the image processing apparatus performing image processing to print a color material of the first color based on the first quantization data and to print a color material of the second color based on the second quantization data, wherein the generation unit, in a case where a sum of the first gradation data and the second gradation data is equal to or smaller than the maximum value of the thresholds arrayed in the first threshold matrix, generates the first quantization data based on a result of comparing the first gradation data with the first threshold and generates the second quantization data based on a result of comparing the second gradation data with the second threshold, and in a case where the sum is greater than the maximum value, generates a first correction amount and a second correction amount by dividing a value that is obtained by subtracting the maximum value from the sum into two, generates the first quantization data by comparing the first gradation data with a value obtained by adding the first correction amount to the first threshold and generates the second quantization data by comparing the second gradation data with a value obtained by adding the second correction amount to the second threshold.

In a third aspect of the present invention, there is provided an image processing apparatus, comprising: a gradation data obtainment unit configured to obtain first gradation data corresponding to a gradation value of a first color and second gradation data corresponding to a gradation value of a second color for a processing-target pixel; a threshold obtainment unit configured to obtain a first threshold for the processing-target pixel from a first threshold matrix including a plurality of arrayed thresholds for pixels and obtain a second threshold for the processing-target pixel from a second threshold matrix in which the thresholds for the pixels are arrayed at such pixel positions that order of the pixel positions is inverse to order of pixel positions in the first threshold matrix in a case where the pixel positions are arranged in ascending order of the thresholds; and a generation unit configured to generate first quantization data and second quantization data that have N gradations (N is an integer equal to or greater than 3), with N being smaller than the number of gradations of the first gradation data and the second gradation data, based on the first threshold, the second threshold, the first gradation data, and the second gradation data: the image processing apparatus performing image processing to print a color material of the first color based on the first quantization data and to print a color material of the second color based on the second quantization data, wherein the generation unit equally divides a gradation domain of the first gradation data and the second gradation data into (N−1) ranges to calculate a first intra-range gradation value that is a gradation value of the first gradation data in a range including the first gradation data and calculate a second intra-range gradation value that is a gradation value of the second gradation data in a range including the second gradation data, and in a case where the range including the first gradation data and the range including the second gradation data are equal, i) in a case where a sum of the first intra-range gradation value and the second intra-range gradation value is equal to or smaller than the maximum value of the thresholds arrayed in the first threshold matrix, generates the first quantization data based on a result of comparing the first intra-range gradation value with the first threshold and generates the second quantization data based on a result of comparing the second intra-range gradation value with the second threshold, and ii) in a case where the sum is greater than the maximum value, generates first overlapping gradation data and second overlapping gradation data by dividing a value that is obtained by subtracting the maximum value from the sum into two, generates the first quantization data based on a result of comparing the first overlapping gradation data with the second threshold or a result of comparing a difference between the first intra-range gradation value and the first overlapping gradation data with the first threshold, and generates the second quantization data based on a result of comparing the second overlapping gradation data with the first threshold or a result of comparing a difference between the second intra-range gradation value and the second overlapping gradation data with the second threshold.

In a fourth aspect of the present invention, there is provided an image processing apparatus, comprising: a gradation data obtainment unit configured to obtain first gradation data corresponding to a gradation value of a first color and second gradation data corresponding to a gradation value of a second color for a processing-target pixel; a threshold obtainment unit configured to obtain a first threshold for the processing-target pixel from a first threshold matrix including a plurality of arrayed thresholds for pixels and obtain a second threshold for the processing-target pixel from a second threshold matrix in which the thresholds for the pixels are arrayed at such pixel positions that order of the pixel positions is inverse to order of pixel positions in the first threshold matrix in a case where the pixel positions are arranged in ascending order of the thresholds; and a generation unit configured to generate first quantization data and second quantization data that have N gradations (N is an integer equal to or greater than 3), with N being smaller than the number of gradations of the first gradation data and the second gradation data, based on the first threshold, the second threshold, the first gradation data, and the second gradation data: the image processing apparatus performing image processing to print a color material of the first color based on the first quantization data and to print a color material of the second color based on the second quantization data, wherein the generation unit equally divides a gradation domain of the first gradation data and the second gradation data into (N−1) ranges to calculate a first intra-range gradation value that is a gradation value of the first gradation data in a range including the first gradation data and calculate a second intra-range gradation value that is a gradation value of the second gradation data in a range including the second gradation data, and in a case where the range including the first gradation data and the range including the second gradation data are equal, i) in a case where a sum of the first intra-range gradation value and the second intra-range gradation value is equal to or smaller than the maximum value of the thresholds arrayed in the first threshold matrix, generates the first quantization data based on a result of comparing the first intra-range gradation value with the first threshold and generates the second quantization data based on a result of comparing the second intra-range gradation value with the second threshold, and ii) in a case where the sum is greater than the maximum value, generates a first threshold offset amount and a second threshold offset amount by dividing a value that is obtained by subtracting the maximum value from the sum into two, generates the first quantization data based on a result of comparing the first intra-range gradation value with a value obtained by adding the first threshold offset amount to the first threshold and generates the second quantization data based on a result of comparing the second intra-range gradation value with a value obtained by adding the second threshold offset amount to the second threshold.

In a fifth aspect of the present invention, there is provided an image processing method, comprising: a gradation data obtaining step of obtaining first gradation data corresponding to a gradation value of a first color and second gradation data corresponding to a gradation value of a second color for a processing-target pixel; a threshold obtaining step of obtaining a first threshold for the processing-target pixel from a first threshold matrix including a plurality of arrayed thresholds for pixels and obtain a second threshold for the processing-target pixel from a second threshold matrix in which the thresholds for the pixels are arrayed at such pixel positions that order of the pixel positions is inverse to order of pixel positions in the first threshold matrix in a case where the pixel positions are arranged in ascending order of the thresholds; and a generating step of generating first quantization data and second quantization data that have a smaller number of gradations than the number of gradations of the first gradation data and the second gradation data based on the first threshold, the second threshold, the first gradation data, and the second gradation data: the image processing method performing image processing for printing a color material of the first color based on the first quantization data and to print a color material of the second color based on the second quantization data, wherein in the generating step, in a case where a sum of the first gradation data and the second gradation data is equal to or smaller than the maximum value of the thresholds arrayed in the first threshold matrix, the first quantization data is generated based on a result of comparing the first gradation data with the first threshold and the second quantization data is generated based on a result of comparing the second gradation data with the second threshold, and in the generating step, in a case where the sum is greater than the maximum value, first overlapping gradation data and second overlapping gradation data are generated by dividing a value that is obtained by subtracting the maximum value from the sum into two, the first quantization data is generated based on a result of comparing the first overlapping gradation data with the second threshold or a result of comparing a difference between the first gradation data and the first overlapping gradation data with the first threshold, and the second quantization data is generated based on a result of comparing the second overlapping gradation data with the first threshold or a result of comparing a difference between the second gradation data and the second overlapping gradation data with the second threshold.

In a sixth aspect of the present invention, there is provided an image processing method, comprising: a gradation data obtaining step of obtaining first gradation data corresponding to a gradation value of a first color and second gradation data corresponding to a gradation value of a second color for a processing-target pixel; a threshold obtaining step of obtaining a first threshold for the processing-target pixel from a first threshold matrix including a plurality of arrayed thresholds for pixels and obtain a second threshold for the processing-target pixel from a second threshold matrix in which the thresholds for the pixels are arrayed at such pixel positions that order of the pixel positions is inverse to order of pixel positions in the first threshold matrix in a case where the pixel positions are arranged in ascending order of the thresholds; and a generating step of generating first quantization data and second quantization data that have a smaller number of gradations than the number of gradations of the first gradation data and the second gradation data based on the first threshold, the second threshold, the first gradation data, and the second gradation data: the image processing method further comprising an image processing step of printing a color material of the first color based on the first quantization data and to print a color material of the second color based on the second quantization data, wherein in the generating step, in a case where a sum of the first gradation data and the second gradation data is equal to or smaller than the maximum value of the thresholds arrayed in the first threshold matrix, the first quantization data is generated based on a result of comparing the first gradation data with the first threshold and the second quantization data is generated based on a result of comparing the second gradation data with the second threshold, and in a case where the sum is greater than the maximum value, a first correction amount and a second correction amount are generated by dividing a value that is obtained by subtracting the maximum value from the sum into two, the first quantization data is generated by comparing the first gradation data with a value obtained by adding the first correction amount to the first threshold, and the second quantization data is generated by comparing the second gradation data with a value obtained by adding the second correction amount to the second threshold.

In a seventh aspect of the present invention, there is provided an image processing method, comprising: a gradation data obtaining step of obtaining first gradation data corresponding to a gradation value of a first color and second gradation data corresponding to a gradation value of a second color for a processing-target pixel; a threshold obtaining step of obtaining a first threshold for the processing-target pixel from a first threshold matrix including a plurality of arrayed thresholds for pixels and obtain a second threshold for the processing-target pixel from a second threshold matrix in which the thresholds for the pixels are arrayed at such pixel positions that order of the pixel positions is inverse to order of pixel positions in the first threshold matrix in a case where the pixel positions are arranged in ascending order of the thresholds; and a generating step of generating first quantization data and second quantization data that have N gradations (N is an integer equal to or greater than 3), with N being smaller than the number of gradations of the first gradation data and the second gradation data, based on the first threshold, the second threshold, the first gradation data, and the second gradation data: the image processing method performing image processing for printing a color material of the first color based on the first quantization data and to print a color material of the second color based on the second quantization data, wherein in the generating step, a gradation domain of the first gradation data and the second gradation data is equally divided into (N−1) ranges to calculate a first intra-range gradation value that is a gradation value of the first gradation data in a range including the first gradation data and calculate a second intra-range gradation value that is a gradation value of the second gradation data in a range including the second gradation data, and in a case where the range including the first gradation data and the range including the second gradation data are equal, i) in a case where a sum of the first intra-range gradation value and the second intra-range gradation value is equal to or smaller than the maximum value of the thresholds arrayed in the first threshold matrix, the first quantization data is generated based on a result of comparing the first intra-range gradation value with the first threshold and the second quantization data is generated based on a result of comparing the second intra-range gradation value with the second threshold, and ii) in a case where the sum is greater than the maximum value, first overlapping gradation data and second overlapping gradation data are generated by dividing a value that is obtained by subtracting the maximum value from the sum into two, the first quantization data is generated based on a result of comparing the first overlapping gradation data with the second threshold or a result of comparing a difference between the first intra-range gradation value and the first overlapping gradation data with the first threshold, and the second quantization data is generated based on a result of comparing the second overlapping gradation data with the first threshold or a result of comparing a difference between the second intra-range gradation value and the second overlapping gradation data with the second threshold.

In a eighth aspect of the present invention, there is provided an image processing method, comprising: a gradation data obtaining step of obtaining first gradation data corresponding to a gradation value of a first color and second gradation data corresponding to a gradation value of a second color for a processing-target pixel; a threshold obtaining step of obtaining a first threshold for the processing-target pixel from a first threshold matrix including a plurality of arrayed thresholds for pixels and obtain a second threshold for the processing-target pixel from a second threshold matrix in which the thresholds for the pixels are arrayed at such pixel positions that order of the pixel positions is inverse to order of pixel positions in the first threshold matrix in a case where the pixel positions are arranged in ascending order of the thresholds; and a generating step of generating first quantization data and second quantization data that have N gradations (N is an integer equal to or greater than 3), with N being smaller than the number of gradations of the first gradation data and the second gradation data, based on the first threshold, the second threshold, the first gradation data, and the second gradation data: the image processing method performing image processing for printing a color material of the first color based on the first quantization data and to print a color material of the second color based on the second quantization data, wherein in the generating step, a gradation domain of the first gradation data and the second gradation data is equally divided into (N−1) ranges to calculate a first intra-range gradation value that is a gradation value of the first gradation data in a range including the first gradation data and calculate a second intra-range gradation value that is a gradation value of the second gradation data in a range including the second gradation data, and in a case where the range including the first gradation data and the range including the second gradation data are equal, i) in a case where a sum of the first intra-range gradation value and the second intra-range gradation value is equal to or smaller than the maximum value of the thresholds arrayed in the first threshold matrix, the first quantization data is generated based on a result of comparing the first intra-range gradation value with the first threshold and the second quantization data is generated based on a result of comparing the second intra-range gradation value with the second threshold, and ii) in a case where the sum is greater than the maximum value, a first threshold offset amount and a second threshold offset amount are generated by dividing a value that is obtained by subtracting the maximum value from the sum into two, the first quantization data is generated based on a result of comparing the first intra-range gradation value with a value obtained by adding the first threshold offset amount to the first threshold, and the second quantization data is generated based on a result of comparing the second intra-range gradation value with a value obtained by adding the second threshold offset amount to the second threshold.

Further features of the present invention will become apparent from the following description of exemplary embodiments with reference to the attached drawings.

BRIEF DESCRIPTION OF THE DRAWINGS

FIG. 7 is a diagram that shows a threshold matrix for a first color and a threshold matrix for a second color;

FIGS. 15A and 15B are diagrams for comparing dot printing states;

FIGS. 16A and 16B are diagrams for comparing dot printing states;

FIG. 22 is a diagram that shows correspondence between quantization reference values and comparative values in the second embodiment;

FIG. 25 is a diagram that shows correspondence between quantization reference values and comparative values in a third embodiment;

DESCRIPTION OF THE EMBODIMENTS

First Embodiment

Figure 1:
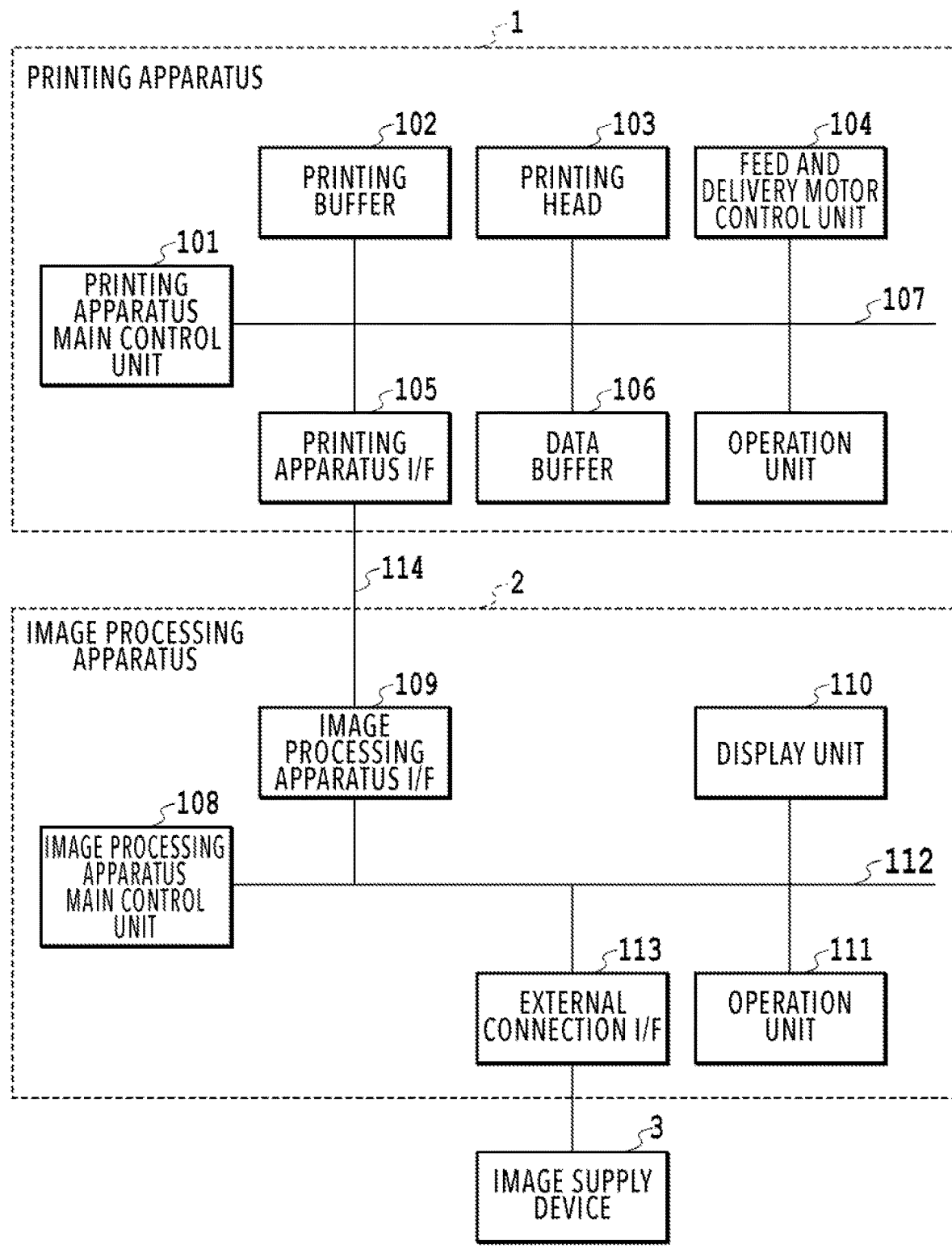
FIG. 1 is a block diagram that shows a configuration for controlling an inkjet printing system.

FIG. 1 is a block diagram that shows a configuration for controlling an inkjet printing system applicable to the present invention. An inkjet printing system of this embodiment includes an image supply device 3, an image processing apparatus 2, and an inkjet printing apparatus 1 (hereinafter, also called a printing apparatus, simply). Predetermined image processing is performed by the image processing apparatus 2 on image data supplied from the image supply device 3, and the image data is then transmitted to the printing apparatus 1 and is printed with inks as color materials.

In the printing apparatus 1, a printing apparatus main control unit 101 is for controlling the overall printing apparatus 1 and includes a CPU, ROM, RAM, and so on. A printing buffer 102 can store image data before transference of the image data to a printing head 103 as raster data. The printing head 103 is an inkjet printing head including multiple printing elements capable of ejecting the inks as droplets, and the printing head 103 ejects the inks from the corresponding printing elements based on the image data stored in the printing buffer 102. In this embodiment, rows of the printing elements of three colors, which are cyan, magenta, and yellow, are aligned on the printing head 103.

A feed and delivery motor control unit 104 conveys a printing medium and controls feeding and delivering of the printing medium. A printing apparatus interface (I/F) 105 exchanges data signals with the image processing apparatus 2. An I/F signal line 114 connects the printing apparatus interface (I/F) 105 and the image processing apparatus 2. The I/F signal line 114 may be a signal line in compliance with the specifications of Centronics, for example. A data buffer 106 temporarily stores image data received from the image processing apparatus 2. A system bus 107 connects the functions of the printing apparatus 1 with each other.

Meanwhile, in the image processing apparatus 2, an image processing apparatus main control unit 108 is for performing many kinds of processing on the image supplied from the image supply device 3 to generate image data that can be printed by the printing apparatus 1, and includes a CPU, ROM, RAM, and so on. The image processing apparatus main control unit 108 also includes the later-described characteristic configuration of the present invention shown in FIGS. 4, 19, and 26, and the flowcharts described with reference to FIGS. 3, 11A to 11C, 18, 23, 24, and 27 show processes executed by the CPU in the image processing apparatus main control unit 108. An image processing apparatus interface (I/F) 109 exchanges data signals with the printing apparatus 1. An external connection interface (I/F) 113 exchanges image data and the like with the externally connected image supply device 3. A display unit 110 displays various kinds of information to the user, and an LCD may be applied as the display unit 110, for example. An operation unit 111 is a mechanism that allows the user to perform command operations, and a keyboard and mouse may be applied as the operation unit 111, for example. A system bus 112 connects the image processing apparatus main control unit 108 with the functions.

In addition to the image data supplied from the image processing apparatus 2, the printing apparatus 1 may directly receive and print image data stored in a storage medium such as a memory card and image data from a digital camera.

Figure 2:
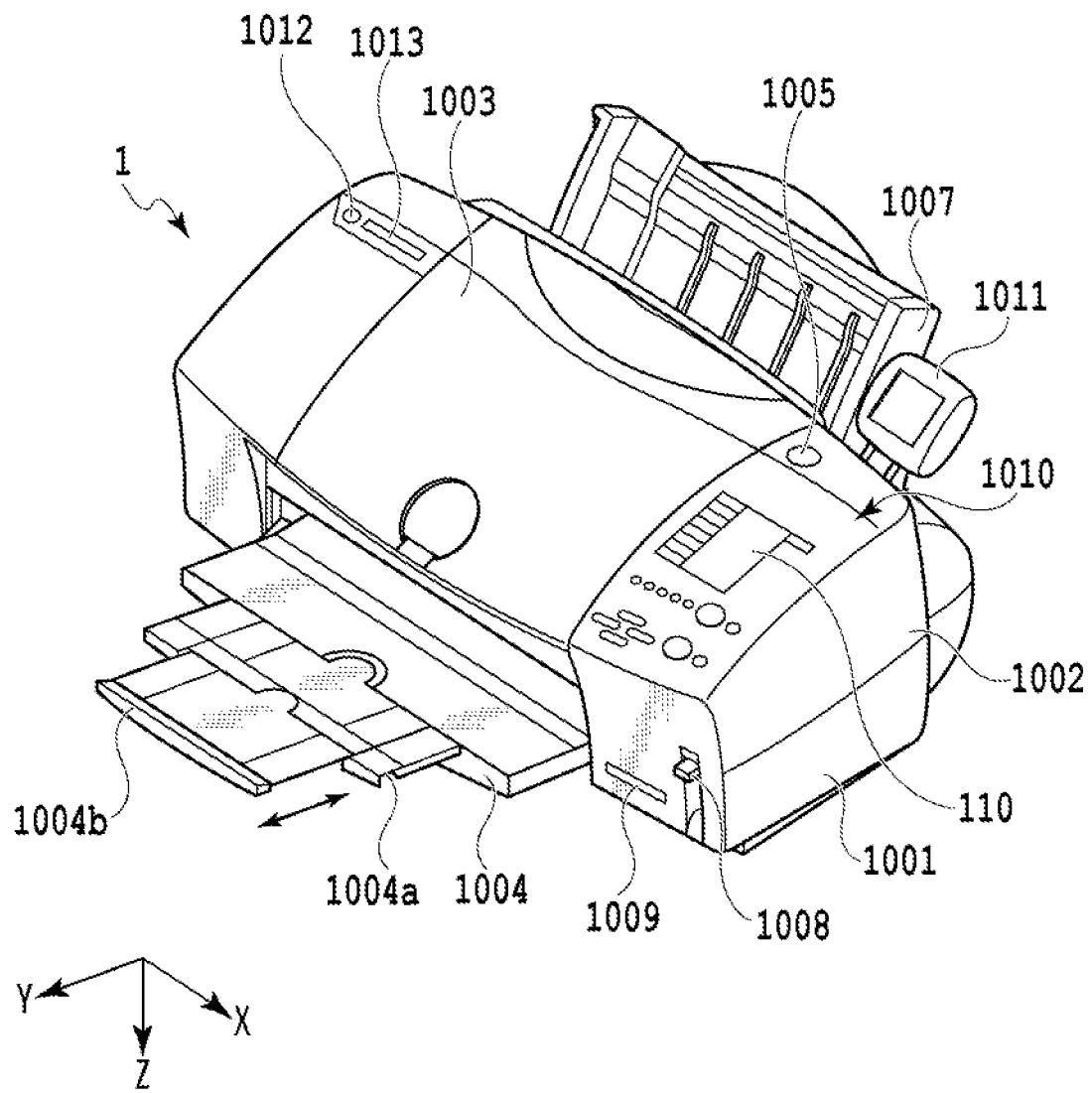
FIG. 2 is a schematic perspective view of a printing apparatus.

FIG. 2 is a schematic perspective view of the printing apparatus 1 used in this embodiment. The printing apparatus 1 has a function of a normal PC printer that receives and prints the data from the image processing apparatus 2 and a function of printing the image data stored in the storage medium such as a memory card and the image data received from a digital camera.

A main body forming an outer shell of the printing medium 1 includes exterior members, which are a lower case 1001, an upper case 1002, an access cover 1003, a feed tray 1007, and a delivery tray 1004. The lower case 1001 forms a substantially lower half portion of the apparatus 1, and the upper case 1002 forms a substantially upper half portion of the main body. The combination of the two cases forms a housing space in which the mechanisms are housed.

The feed tray 1007 can stack and hold multiple printing media and is adapted to automatically feed the top one of the printing medium to the inside of the apparatus once a printing command is inputted. On the other hand, the delivery tray 1004 includes one end portion that is pivotably held by the lower case 1001, and the pivot movement allows an opening formed at a front surface portion of the lower case 1001 to open and close. To execute a printing operation, the delivery tray 1004 is pivoted toward the front surface to allow the opening to open and close, and this makes it possible to deliver the printing sheets from the opening and to sequentially stack the delivered printing sheets. The delivery tray 1004 stores two auxiliary trays 1004a and 1004b, and an area for supporting the printing medium can be enlarged and reduced in three levels by pulling the trays as needed.

In the inside space of the apparatus, mechanisms such as the printing head 103 for printing an image on the printing medium, a carriage that is mounted with the printing head 103 and an ink tank and movable to an X direction indicated in FIG. 2, and a transportation mechanism for transporting a predetermined amount of the printing medium in the Y direction, and the like are arranged.

Once the printing command is inputted, the printing medium conveyed inside the apparatus from the feed tray 1007 is transported to a printable area by the printing head 103. Then, after printing scan is performed once by the printing head 103, the conveying mechanism conveys the printing medium in the Y direction corresponding to a distance of a printing width D. An image is gradually formed on the printing medium by repeating the above-described printing scan by the printing head 103 and the conveying of the printing medium. Once the printing is completed, the printing medium is delivered on the delivery tray 1004.

Although a serial inkjet printing apparatus is described as an example herein, the printing apparatus may be a full-line inkjet printing apparatus.

The access cover 1003 includes one end portion that is pivotably held by the upper case 1002 to allow an opening formed at an upper surface of the printing apparatus 1 to open and close. The printing head 103, the ink tank, and the like stored inside the main body can be replaced by opening the access cover 1003. Although illustration is omitted, a protrusion is formed on a back surface of the access cover 1003 to be detected by a microswitch on the main body while closing the access cover 1003. That is, it is possible to detect an open/close state of the access cover 1003 based on a detection result of the protrusion obtained by the microswitch.

A power key 1005 to be pressed is provided on an upper surface of the upper case 1002. An operation panel 1010 including a liquid crystal display unit 110, various key switches, and the like is also provided on the upper surface of the upper case 1002.

A distance selection lever 1008 is a lever for adjusting a distance between an ink discharge surface of the printing head 103 and a surface of the printing medium. A card slot 1009 is an opening for receiving an adaptor to which a memory card can be inserted. Image data stored in the memory card is transmitted to a control unit 3000 of the printing apparatus through the adaptor inserted to the card slot 1009, and after predetermined processing is performed on the image data, the image data is printed on the printing medium. The memory card (PC) may be a compact flash (registered trademark) memory, smart media, memory stick, and the like, for example. A viewer (liquid crystal display unit) 1011 displays a single image or an index image during, for example, searching for an image to be printed from the images stored in the memory card. In this embodiment, the viewer 1011 is detachably attached on the main body of the printing apparatus 1. A terminal 1012 is a terminal for connecting a digital camera, and a terminal 1013 is a USB bus connector for connecting a personal computer (PC).

Figure 3:
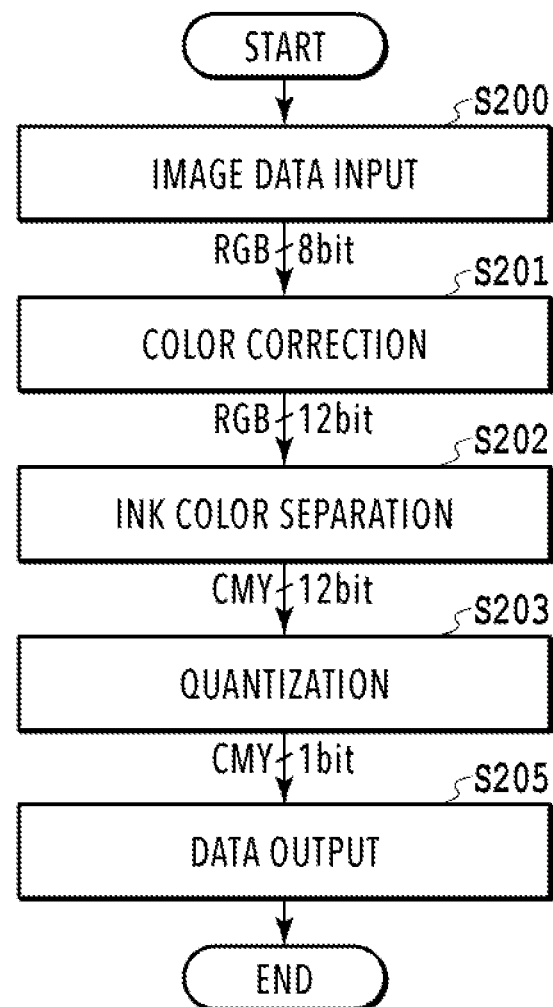
FIG. 3 is a flowchart for describing image processing of a first embodiment.

FIG. 3 is a flowchart for describing the image processing performed by the image processing apparatus main control unit 108 of this embodiment. This processing is executed by the CPU in the image processing apparatus main control unit 108 according to a program stored in the ROM.

In FIG. 3, once image data of processing-target pixels is inputted from the image supply device 3 (step S200), first, in step S201, the image processing apparatus main control unit 108 executes color correction. The image data received by the image processing apparatus 2 from the image supply device 3 is 8-bit lightness data of R (red), G (green), and B (blue) for expressing a standardized color space such as sRGB. In step S201, the lightness data is converted to RGB 12-bit lightness data corresponding to a color space unique to the printing apparatus. To convert the signal values, a publicly known method such as referring to a lookup table (LUT) stored in the ROM or the like in advance may be employed.

In step S202, the image processing apparatus main control unit 108 separates the converted RGB data into pieces of 12-bit gradation data (density data) of C (cyan), M (magenta), and Y (yellow), which are ink colors of the printing apparatus. In this stage, three channels (three colors) of 12-bit gray images are generated. In the ink color separation processing, it is also possible to refer to the lookup table (LUT) stored in the ROM or the like in advance like the color correction processing.

In step S203, the image processing apparatus main control unit 108 performs predetermined quantization processing on the pieces of 12-bit gradation data corresponding to the ink colors and converts the 12-bit gradation data to 1-bit binary data. The quantization processing is described in detail later.

Once the quantization processing ends, the image processing apparatus main control unit 108 outputs the generated binary data to the printing apparatus (step S205). With that, the processing ends.

While the steps described in FIG. 3 are processed by the inkjet printing system of this embodiment, a boundary of steps processed by the image processing apparatus 2 and steps processed by the printing apparatus 1 is not precisely determined. For example, in a case where the steps from the beginning to the quantization are performed by the image processing apparatus 2, the quantized data may be transferred to the printing apparatus 1, and the printing operation may be controlled by the printing apparatus main control unit 101 that performs index expansion in step S204 using an index pattern stored in the data buffer 106. Depending on the capability, the printing apparatus 1 may directly receive multi-valued RGB image data and perform all the steps of S201 to S203.

Figure 4:
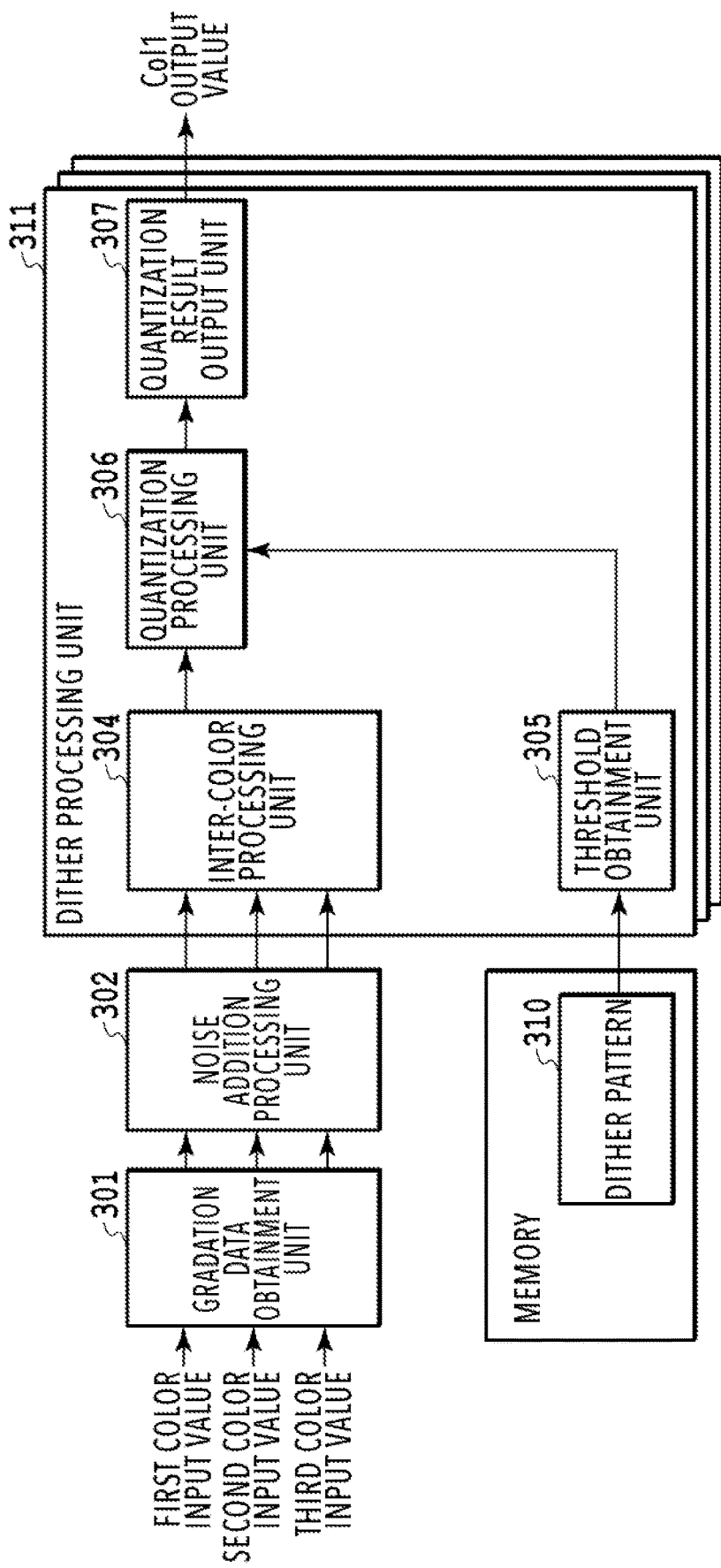
FIG. 4 is a block diagram of quantization processing of the first embodiment.

FIG. 4 is a block diagram of the quantization processing executed in step S203 in FIG. 3. In the quantization processing of this embodiment, first, processing on the input values is performed, processing on the thresholds is then performed, and quantization processing by a dither method is finally performed. The series of processes are parallel processed on the different colors (channels). Hereinafter, the processes are described in detail with reference to FIG. 4.

A gradation data obtainment unit 301 obtains the pieces of 12-bit gradation data indicating density of the pixels. The gradation data obtainment unit 301 of this embodiment can receive signals of up to 12 bits of eight colors. FIG. 4 shows a state in which pieces of 12-bit data of a first color to a third color are inputted.

A noise addition processing unit 302 adds predetermined noise to the 12-bit gradation data. Adding of noise makes it possible to avoid sequential arrangement of the same patterns even in a case where pieces of gradation data of the same level are sequentially inputted, and this inhibits stripe, texture, and the like. The noise addition processing unit 302 multiplies a predetermined random table, fixed intensity, and variable intensity corresponding to an input value, and thus noise is generated for each pixel and added to the input value. Note that the random table is a table adapted to set the polarity of noise, and sets a plus, zero, or a minus for each pixel position. The random table in this embodiment can have at most eight faces, and the size of each table can be arbitrarily set. The fixed intensity indicates the intensity of noise amount, and the magnitude of the intensity determines whether noise is large or small. In this embodiment, a noise amount can be appropriately adjusted by setting a random table and fixed intensity optimum for each print mode depending on the granularity and the degrees of stripe and texture of an image.

The above-described processes by the gradation data obtainment unit 301 and the noise addition processing unit 302 are parallel processed on the pieces of gradation data of different colors. That is, in this embodiment, pieces of 12-bit data are respectively generated for cyan, magenta, and yellow and are inputted to a dither processing unit 311.

In the dither processing unit 311, the pieces of 12-bit data of the different colors are inputted to an inter-color processing unit 304. The inter-color processing unit 304 performs predetermined processing on the inputted gradation data of a processing-target color based on the gradation data of the processing-target color and the gradation data of a color other than the processing-target color to obtain comparison-target data, and transmits the comparison-target data to a quantization processing unit 306. The quantization processing unit 306 compares the received comparison-target data with a threshold obtained from a threshold obtainment unit 305 and determines printing (1) or not-printing (0) (high level or low level) of the processing-target color.

The threshold obtainment unit 305 selects one corresponding threshold matrix from multiple dither patterns 310 stored in a memory such as the ROM and obtains a threshold for a pixel position of the processing-target data. In this embodiment, the dither pattern 310 is a threshold matrix including arrayed thresholds 0 to 4095 and having blue noise characteristics, and the size and shape of the dither pattern 310 may have variations such as 512×512 pixel, 256×256 pixel, and 512×256 pixel. That is, the memory stores such multiple threshold matrixes in different sizes and shapes in advance, and the threshold obtainment unit 305 selects a threshold matrix corresponding to the print mode and the ink color from the threshold matrixes in the memory. Then, the threshold obtainment unit 305 provides the inter-color processing unit 304 with a threshold for a pixel position (i) of the processing-target data among multiple thresholds arrayed in the selected threshold matrix.

In this process, in a case of employing the later-described "sequentially adding type inter-color processing" of this embodiment, the inter-color processing unit 304 adds a density value to the received gradation data of the processing-target color, the density value being indicated by gradation data of a color that is other than the processing-target color and is set as a reference color in advance. Then, the inter-color processing unit 304 transmits the obtained value to the quantization processing unit 306 as the comparison-target data. If the value obtained by the addition is greater than the maximum value of the threshold matrix (that is 4096 in the case of 12 bits), the maximum value is subtracted from the obtained value, and the newly obtained value is transmitted to the quantization processing unit 306.

In this process, "no" reference color is set for a color set as the first color in the "sequentially adding type inter-color processing." Thus, for the first color, the quantization processing unit 306 performs quantization processing according to the threshold matrix stored as the dither pattern 310. On the other hand, "first color" is set as the reference color for a color set as the second color in the "sequentially adding type inter-color processing." Thus, for the second color, quantization processing is performed based on an input gradation value In2 of the second color, an input gradation value In1 of the first color, and a threshold Dth stored in the threshold matrix.

Specifically, first, a value In'2 is obtained by adding the input gradation value In1 of the first color to the input gradation value In2 of the second color:

$$In'2 = In1 + In2.$$

If the value In'2 obtained by the addition is greater than the maximum value Dthmax among the thresholds, the maximum value Dthmax is subtracted:

$$In'2 = In'2 - Dthmax.$$

Thereafter, in a case where In'2>Dth and In1<Dth, printing (1) is set for the second color in the processing-target image.

On the other hand, in a case where In'2>Dth and In1>Dth, or in a case where In'2≤Dth, not-printing (0) is set for the second color in the processing-target image. Hereinafter, the above-described processing is continuously called the "sequentially adding type inter-color processing."

Figure 5:
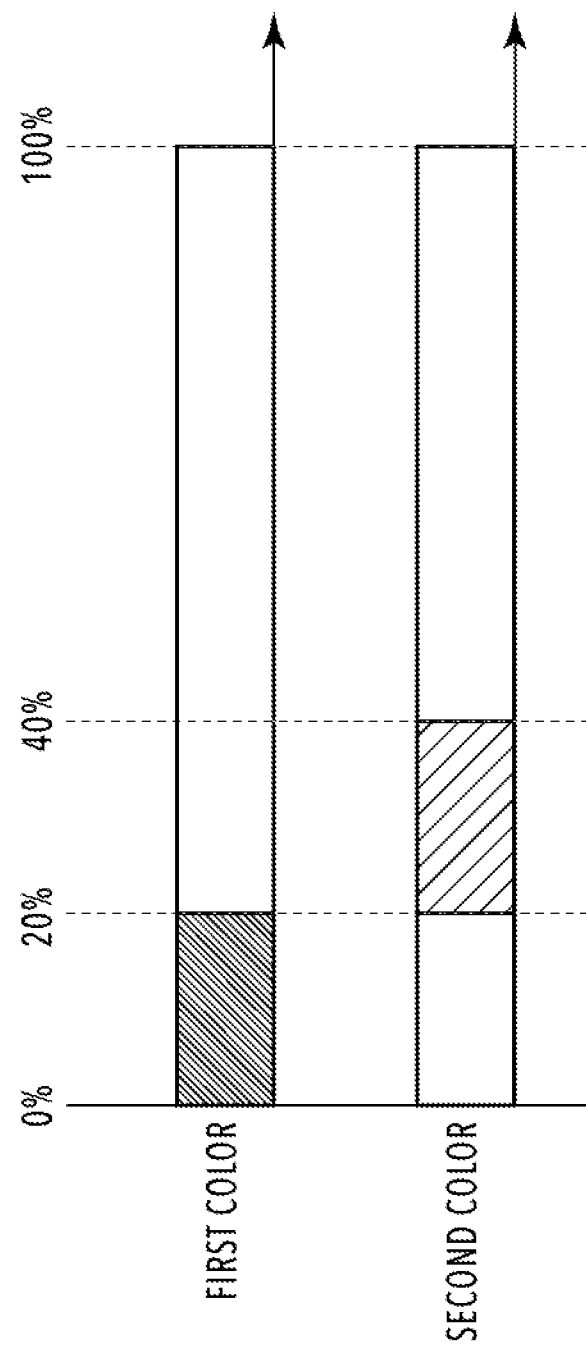
FIG. 5 is a diagram that shows a dot printing state in a case of performing "sequentially adding type inter-color processing;"

FIG. 5 is a diagram that shows a dot printing state with respect to thresholds stored in the threshold matrix in a case of the quantization with the "sequentially adding type inter-color processing." The horizontal axis indicates a density value, and 0% corresponds to the minimum value "0" among the thresholds arrayed in the threshold matrix while 100% corresponds to the maximum value among those thresholds (that is 4095 in the case of 12 bits). Now, there is shown a case where density data of around 20% (820) is inputted for each of the first color and the second color.

In the "sequentially adding type inter-color processing," dots of the first color for which "no" reference color is set are printed in positions in which thresholds 0 to 20% (0 to 820) are set. On the other hand, dots of the second color for which "first color" is set as the reference color are printed in positions in which thresholds 20 to 40% (821 to 1639) are set. Additionally, mixed dots of the first color and the second color are printed in positions in which thresholds 0 to 40% (0 to 1639) are set. Dots of the first color and dots of the second color are not overlapped with each other since they are printed in different pixel positions in the threshold matrix.

Figure 6A:
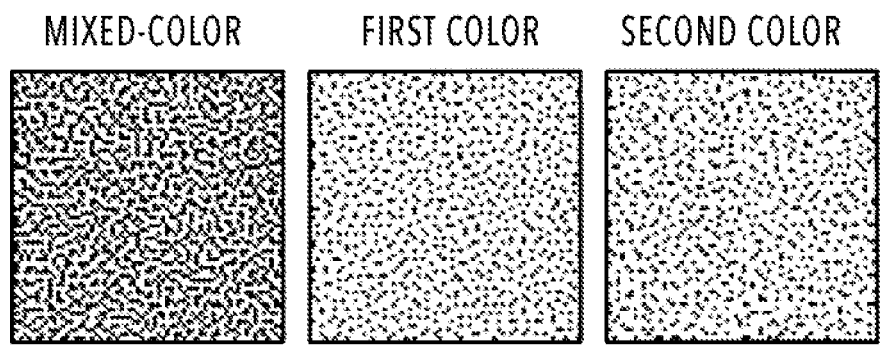
FIG. 6A is a diagram that shows a dot arrangement state.
Figure 6B:
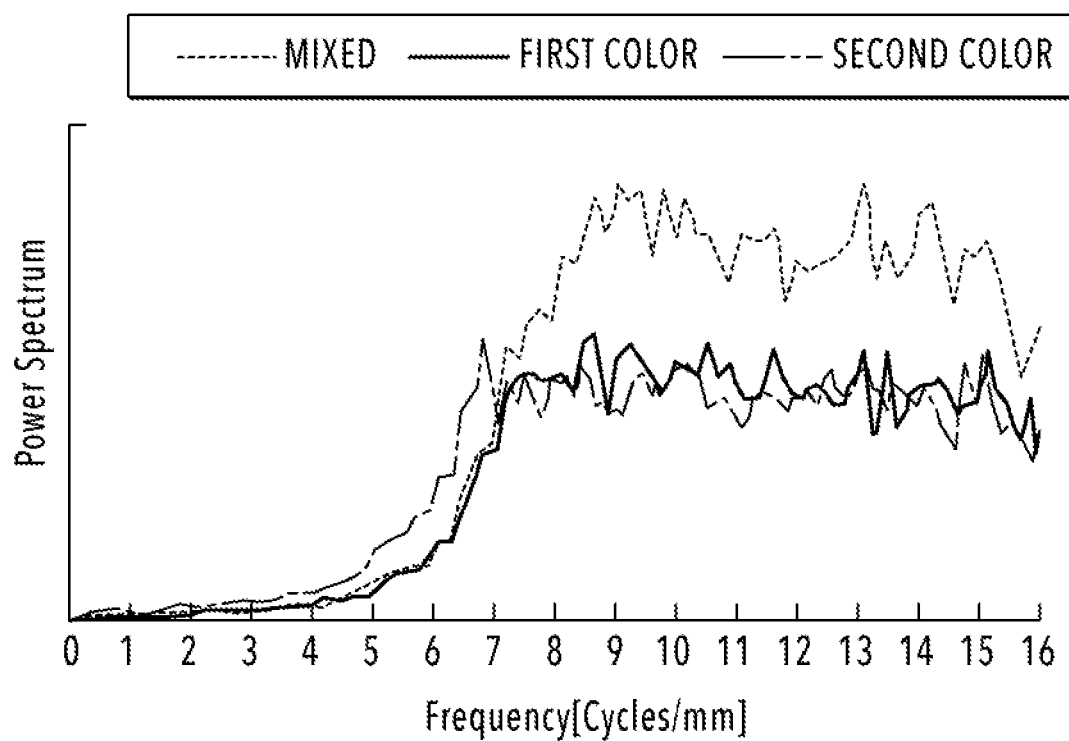
FIG. 6B is a diagram that shows spatial frequency properties.

FIG. 6A and FIG. 6B are diagrams that respectively show a dot arrangement state and power distributions of spatial frequencies in a case of performing the "sequentially adding type inter-color processing" described in FIG. 5 using the threshold matrix having blue noise characteristics. As shown in FIG. 6A, all of the single-color dots of the first color, the single-color dots of the second color, and the mixed dots of the two colors are arranged with high dispersibility. As shown in FIG. 6B, all types of dots are arranged with blue noise characteristics that allow for suppressed low frequency components, rapid rise, and flat high frequency components.

However, blue noise characteristics of the single-color dots of the second color are slightly different from those of the single-color dots of the first color and the mixed dots, since the single-color dots of the second color are arranged in the positions of middle thresholds of the threshold matrix (that are thresholds not from 0 but between 821 and 1640). That is, the power spectrum rises early, low frequency components becomes high, and the dot dispersibility is low.

According to examination by the inventors, it is confirmed that it is effective to use two threshold matrixes in which orders of positions of the pixels corresponding to orders of thresholds are inverse to each other. Specifically, in a case where Dthmax is the maximum value among thresholds and Dth is a threshold in a predetermined pixel position in a threshold matrix having blue noise characteristics, a threshold Dth1 of the first color and a threshold Dth2 of the second color in a predetermined pixel position may be determined by the following expressions:

$$Dth1=Dth\ Dth2=Dthmax-Dth \qquad \text{(Expression 2)}.$$

FIG. 7 is a diagram for describing a threshold matrix for the first color and a threshold matrix for the second color created by the above-described method. In this case, for the sake of simplicity, the threshold matrixes each have 4×4 pixel area in which thresholds 0 to 15 are set, and Dthmax=15. For a pixel in which the minimum value 0 is set in the first threshold matrix, the maximum value 15 is set in the second threshold matrix, and for a pixel in which the maximum value 15 is set in the first threshold matrix, the minimum value 0 is set in the second threshold matrix.

The coordinate positions in FIG. 7 use alphabet signs. Specifically, the coordinate positions of the pixels in the first threshold matrix and the second threshold matrix in FIG. 7 are indicated by the alphabet signs. In a case where the signs at the coordinate positions of the thresholds in the first matrix are put in ascending order of the corresponding thresholds, the order of the coordinate positions is AHJOGPBIDKMFNCEL. On the other hand, in a case where the signs at the coordinate positions of the thresholds in the second matrix are put in ascending order of the corresponding thresholds, the order of the coordinates is LECNFMKDIBPGOJHA. That is, the first threshold matrix and the second threshold matrix have a relationship of inverse sign order in the case where the signs at the coordinate positions of the thresholds are put in ascending order of the thresholds or in order of the number incremented from 0 by 1. Needless to say, the inverse relationship is also made in a case of putting the signs at the coordinate positions in descending order of the thresholds.

Hereinafter, the two threshold matrixes having the inverse orders of pixel positions according to the order of thresholds are called "threshold matrixes in the inverse relationship." The quantization processing performed on two colors using thresholds in the inverse relationship according to (Expression 2) based on one threshold matrix is called "quantization processing of Expression (2)."

Figure 8A:
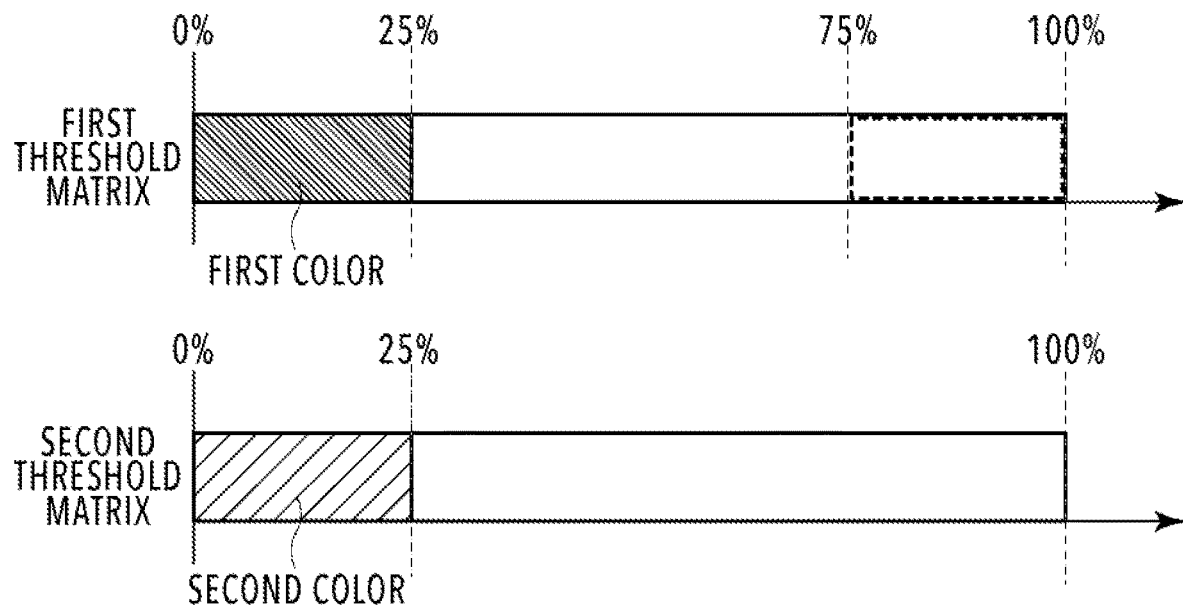
FIGS. 8A and 8B are diagrams that show dot printing states corresponding to thresholds.
Figure 8B:
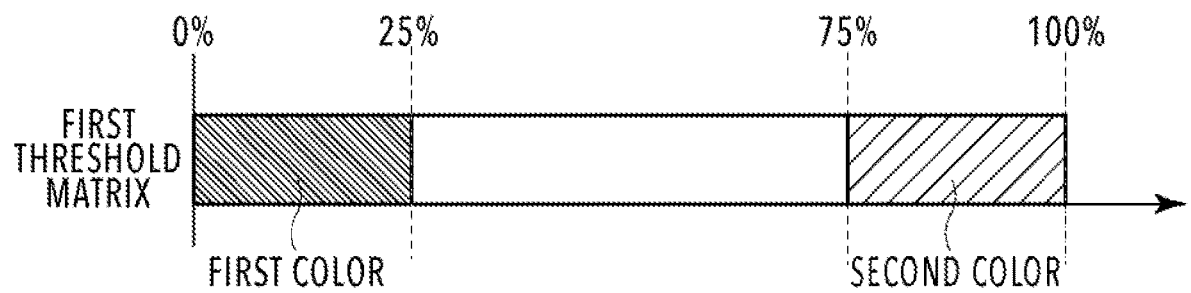

FIGS. 8A and 8B are diagrams that show dot printing states corresponding to thresholds in a case of performing the quantization processing on the first color and the second color with the first threshold matrix and the second threshold matrix in the inverse relationship. In this case, density data of around 25% (1024) is inputted to each of the first color and second color.

FIG. 8A shows a printing state of the first color dots corresponding to thresholds in the first threshold matrix and a printing state of the second color dots corresponding to thresholds in the second threshold matrix. FIG. 8B shows printing states of the first color dots and the second color dots corresponding to the thresholds in the first threshold matrix.

According to examination by the inventors, for quantization processing on the first color and the second color both having high dot powers, it is confirmed that the granularity of the second color and the entire image is less conspicuous by using the threshold matrixes in the inverse relationship than the case of applying the "sequentially adding type inter-color processing." In other words, dots printed in a sequential threshold area including the minimum value (the first color in FIG. 8B) and dots printed in a sequential threshold area including the maximum value (the second color in FIG. 8B) can have higher dispersibility than dots printed in a sequential threshold area including neither the minimum nor maximum values (the second color in FIG. 5).

Figure 9A:
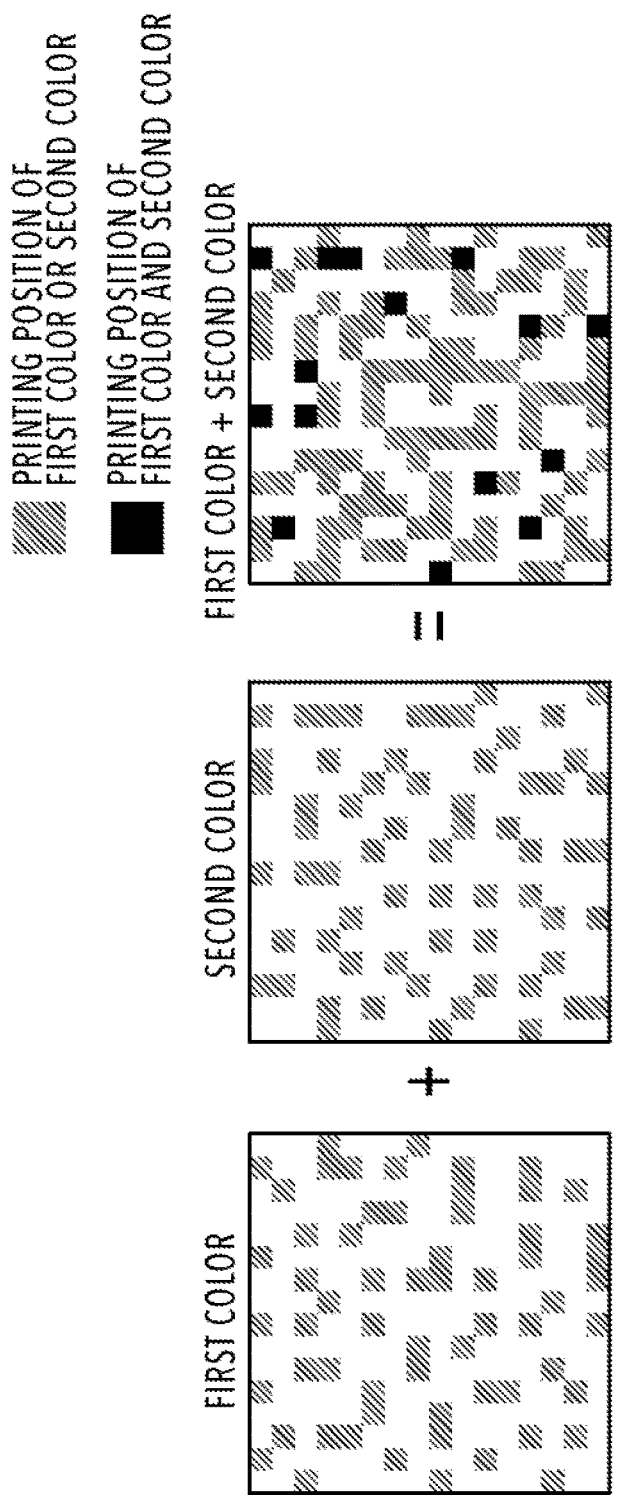
FIGS. 9A and 9B are comparative diagrams of a case of using different threshold matrixes.
Figure 9B:
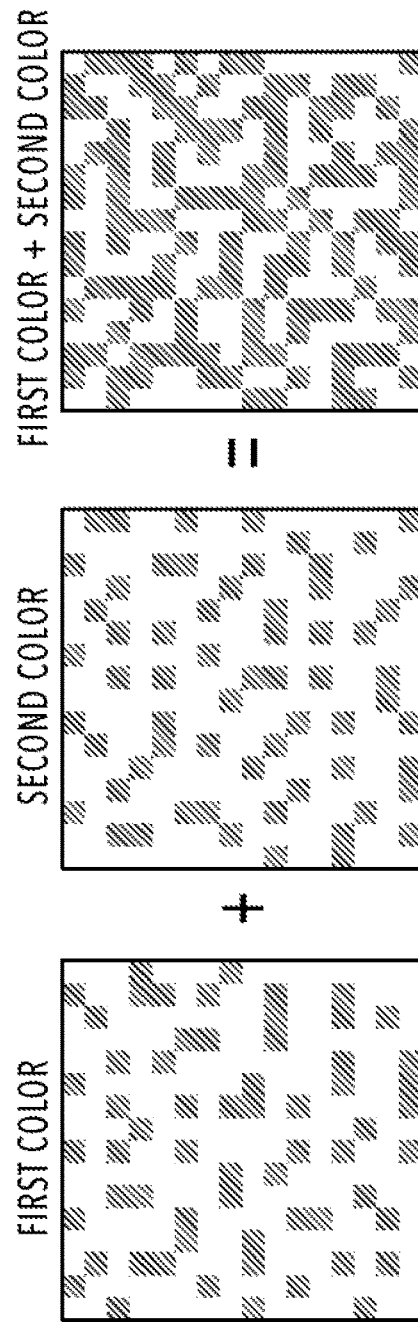

Additionally, use of the threshold matrixes in the inverse relationship can minimize appearance of overlapping dots of the first and second colors. FIGS. 9A and 9B are diagrams for comparing a case of using two threshold matrixes with no relationship with a case of using two threshold matrixes in the inverse relationship for the quantization processing on the first color and the second color. In the case of using two threshold matrixes with no relationship, as shown in FIG. 9A, high dispersibility can be obtained in each case of the first color and the second color, but if the two colors are overlapped, overlapping dots of the two colors are likely to appear even in a low-gradation area.

In contrast, in the case of using two threshold matrixes in the inverse relationship, as shown in FIG. 9B, high dispersibility can be obtained not only in each case of the first color and the second color but also in a case where the two colors are overlapped, and no overlapping dots of the two colors appear in a low-gradation area. This is because the positions in which dots of the first color and the second color are arranged in mutually exclusive threshold areas in the same threshold matrix as shown in FIG. 8B.

However, even in the case of using two threshold matrixes in the inverse relationship, overlapping dots of the first and second colors appear in a gradation area in which the gradation value of the first color and the gradation value of the second color increase and their sum becomes greater than the maximum threshold. In such a gradation area, sometimes the granularity is more conspicuous in the case of using two threshold matrixes in the inverse relationship than the case of performing the "sequentially adding type inter-color processing" with a single threshold matrix.

Figure 10A:
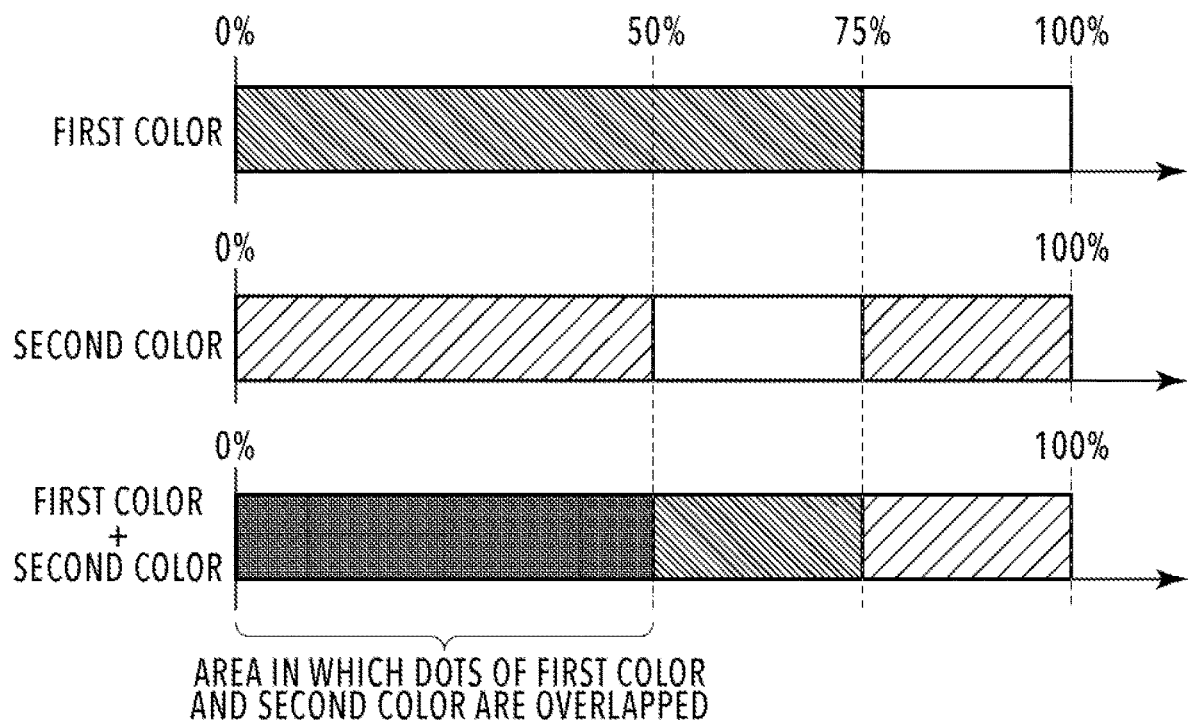
FIGS. 10A and 10B are comparative diagrams of the case of using different threshold matrixes.
Figure 10B:
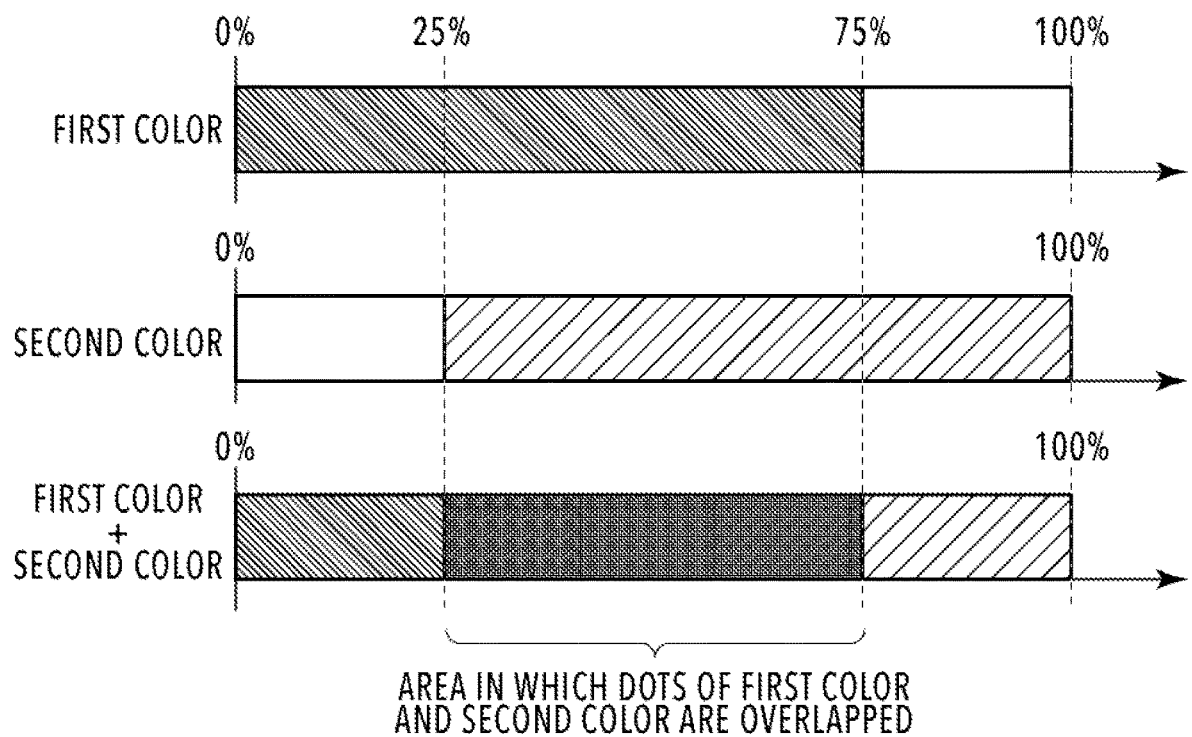

FIGS. 10A and 10B are diagrams for comparing dot printing states corresponding to thresholds in the case of performing the "sequentially adding type inter-color processing" with a single threshold matrix and the case of performing the "quantization processing of Expression (2)." Both the diagrams show a case where density data of around 75% (3072) is inputted to each of the first color and the second color.

Note that, for the first color in both the cases, dots are printed in positions in which thresholds 0 to 75% (0 to 3071) are set.

In contrast, for the second color, dots are printed in areas of 75 to 100% (3072 to 4095) and 0 to 50% (0 to 2047) in the case of performing the "sequentially adding type inter-color processing" as shown in FIG. 10A, and dots are printed in an area of 25 to 100% (1024 to 4095) in the case of performing the "quantization processing of Expression (2)" as shown in FIG. 10B.

Focusing on a threshold area in which both of the first color and second color are printed (a threshold area in which overlapping dots are printed), it is the area of 0 to 50% (0 to 2047) in FIG. 10A, and it is the area of 25 to 75% (1024 to 3071) in FIG. 10B. Hereinafter, such a threshold area in which both of the first color and the second color are printed is called an overlapping gradation area. That is, an overlapping gradation area in the case of the "sequentially adding type inter-color processing" is the sequential area including the minimum threshold, but an overlapping gradation area in the case of the "quantization processing of Expression (2)" is the sequential area including neither the maximum nor minimum thresholds. Thus, the dispersibility of the overlapping dots appearing in the "quantization processing of Expression (2)" is lower than the dispersibility of the overlapping dots appearing in the "sequentially adding type inter-color processing," and this causes the granularity to be conspicuous.

That is, comparing the "sequentially adding type inter-color processing" with the "quantization processing of Expression (2)," the "quantization processing of Expression (2)" achieves better dispersibility in a gradation area with no overlapping dots, but the "sequentially adding type inter-color processing" achieves better dispersibility in a gradation area with overlapping dots having high dot power appear.

Based on the above, the inventors found out that it is effective to use different quantization methods between a low-gradation area in which the sum of the first color gradation value and the second color gradation value is equal to or smaller than the maximum threshold and a high-gradation area in which the sum is greater than the maximum value in order to obtain the preferable dispersibility in the entire gradation area.

Figure 11A:
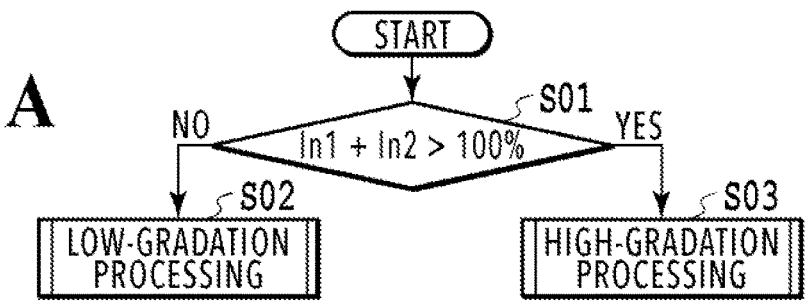
FIGS. 11A to 11C are flowcharts of the quantization processing of the first embodiment.
Figure 11B:
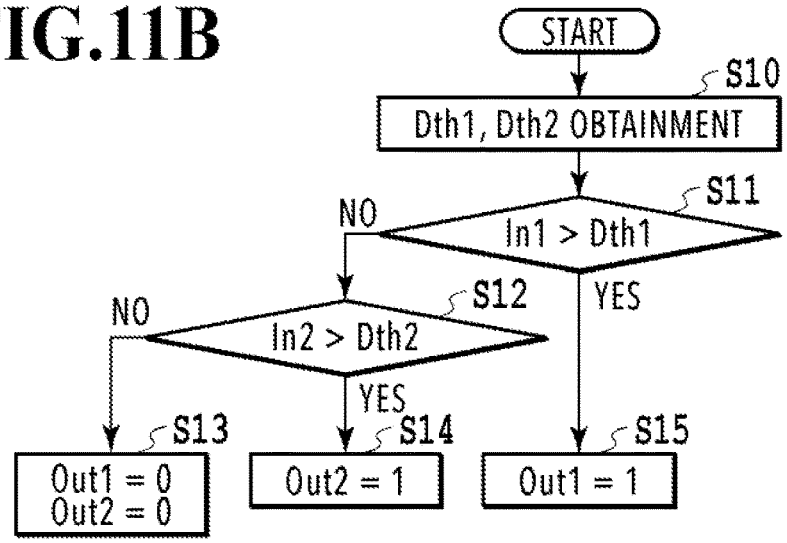
Figure 11C:
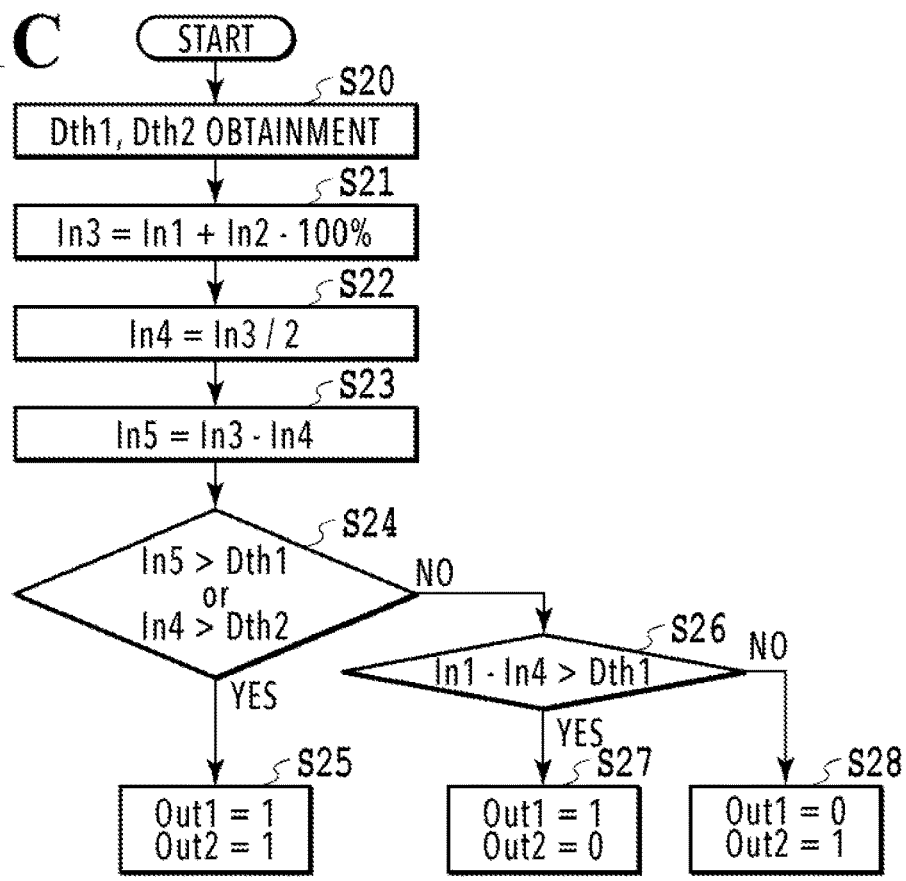

FIGS. 11A to 11C are flowcharts for describing processes for the quantization of the first color and the second color executed by the dither processing unit 311 of this embodiment. Once gradation data In1 of the first color and gradation data In2 of the second color are inputted for a processing-target pixel, first, in S01 in FIG. 11A, the dither processing unit 311 determines whether the sum of the gradation data In1 of the first color and the gradation data In2 of the second color is greater than 100%. For example, in a case of 12-bit gradation data, the dither processing unit 311 determines whether the sum of the gradation data In1 and the gradation data In2 is equal to or greater than 4096. If the sum is equal to or smaller than 100% (equal to or smaller than 4095), the process proceeds to "low-gradation processing" S02, and if the sum is greater than 100% (equal to or greater than 4096), the process proceeds to "high-gradation processing" S03.

FIG. 11B is a diagram that shows steps of the "low-gradation processing" executed in S02. In the "low-gradation processing" S02 to which the process proceeds if the sum of In1 and In2 is equal to or smaller than 100%, no overlapping gradation area appears even with the "quantization processing of Expression (2)." Thus, the "quantization processing of Expression (2)" is performed to give priority to the dispersibility of single-color dots of the first and second colors.

Once the processing is started, first, in S10, the dither processing unit 311 obtains the thresholds Dth1 and Dth2 for a processing-target pixel. The threshold Dth2 may be read from a second threshold matrix that is stored in advance as a threshold matrix having the inverse relationship with the first threshold matrix, or may be calculated based on the threshold Dth1 by using (Expression 2).

Next, in S11, the dither processing unit 311 compares the gradation data In1 of the first color with the threshold Dth1 obtained in S10. If In1>Dth1, the process proceeds to S15 and an output value (quantization value) of the first color is set to "1" (printing), and if In1≤Dth1, the process proceeds to S12.

In S12, the dither processing unit 311 compares the gradation data In2 of the second color with the threshold Dth2 obtained in S10. If In2>Dth2, the process proceeds to S14 and an output value (quantization value) of the second color is set to "1" (printing), and if In2≤Dth2, the process proceeds to S13 and the output values (quantization values) for the first color and the second color are both set to "0" (not-printing).

FIG. 11C is a diagram that shows steps of the "high-gradation processing" executed in S03 in FIG. 11A. In the "high-gradation processing" S03 to which the process proceeds if the sum of In1 and In2 is greater than 100%, an overlapping gradation area appears with the "quantization processing of Expression (2)." Thus, processing that can give priority to not only the dispersibility of single-color dots of the first and second colors but also the dispersibility of overlapping dots of the first and second colors.

Once the processing is started, first, in S20, the dither processing unit 311 obtains the threshold Dth1 for the first color and the threshold Dth2 for the second color for a processing-target pixel. Like the case of the "low-gradation processing," the threshold Dth2 may be read from a second threshold matrix that is stored in advance, or may be calculated based on the threshold Dth1 by using (Expression 2).

In S21, the dither processing unit 311 obtains an overlapping gradation area width In3. The overlapping gradation area width In3 indicates a width of the threshold area in which both of the first color and the second color are printed and is expressed by (Expression 3):

$$In3=In1+In2-Dth\max \quad \text{(Expression 3)}.$$

In S22, the dither processing unit 311 equally divide the overlapping gradation area width In3 into two to calculate a first overlapping gradation width In4 (first overlapping gradation data):

$$In4=In3/2.$$

If the thus-obtained value includes a fraction, it is cut off to obtain In4.

Additionally, in S23, the dither processing unit 311 subtracts the first overlapping gradation width In4 from the overlapping gradation area width In3 to calculate a second overlapping gradation width In5 (second overlapping gradation data):

$$In5=In3-In4.$$

In S24, the dither processing unit 311 determines whether In5>Dth1 (Condition 1) or In4>Dth2 (Condition 2) is satisfied. If either of Condition 1 and Condition 2 is satisfied, the process proceeds to S25 and the output value (Out1) of the first color and the output value (Out2) of the second color are both set to "1" (printing). The pixel satisfying Condition 1 is a pixel in which printing is made according to the first threshold matrix, and the pixel satisfying Condition 2 is a pixel in which printing is made according to the second threshold matrix.

On the other hand, in S24, if neither Condition 1 nor Condition 2 is satisfied, the process proceeds to S26 and the dither processing unit 311 determines whether In1−In4>Dth1 (Condition 3) is satisfied. If (Condition 3) is satisfied, the process proceeds to S27 and the output value (quantization value) of the first color is set to "1" (printing) while the output value (quantization value) of the second color is set to "0" (not-printing). On the other hand, if (Condition 3) is not satisfied in S26, the process proceeds to S28 and the output value (quantization value) of the first color is set to "0" (not-printing) while the output value (quantization value) of the second color is set to "1" (printing). The pixel satisfying Condition 3 is a pixel in which a single-color dot of the first color is printed according to the first threshold matrix, and the pixel not satisfying Condition 3 is a pixel in which a single-color dot of the second color is printed according to the second threshold matrix. With that, the processing ends.

Note that, although the pixel satisfying Condition 3 is designated as a pixel for printing a single-color dot of the first color and the pixel not satisfying Condition 3 is designated as a pixel for printing a single-color dot of the second color in S26, it is possible to apply the opposite condition of Condition 3 in S26. That is, it is possible to make determination of whether In2−In5>Dth2 (Condition 3') is satisfied, and if it is satisfied, the first color is set to "0" while the second color is set to "1," and if it is not satisfied, the first color is set to "1" while the second color is set to "0."

Figure 12A:
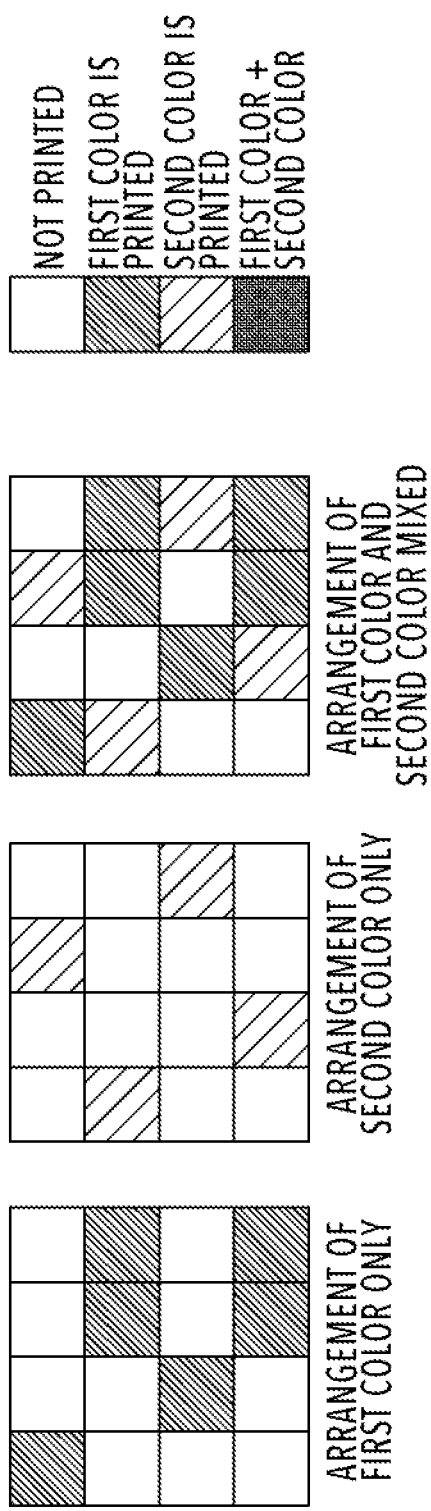
FIGS. 12A and 12B are diagrams that show dot arrangement states in "low-gradation processing;"
Figure 12B:
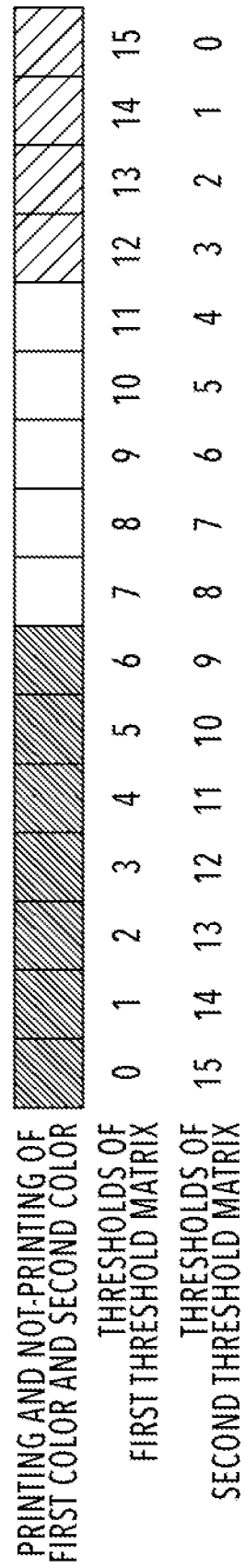

FIGS. 12A and 12B are diagrams that show dot arrangement states of the first color and the second color corresponding to thresholds in the "low-gradation processing." There is shown a case where the two threshold matrixes in the inverse relationship shown in FIG. 7 are used as the first threshold matrix and the second threshold matrix and the input gradation values are In1=6 and In2=4 (In1+In2=10<15).

Dots of the first color are printed in 0 to 5 in the first threshold matrix, and dots of the second color are printed in 0 to 3 (that are 12 to 15 in the first threshold matrix) in the second threshold matrix. That is, the single-color dots of the first color are printed in the sequential area including the minimum value of the first threshold matrix while the single-color dots of the second color are printed in the sequential area including the maximum value of the first threshold matrix, and thus no overlapping gradation area appears. Consequently, both of the single-color dots of the first color and the single-color dots of the second color are printed with high dispersibility, and a smooth image with no conspicuous granularity can be outputted.

Figure 13A:
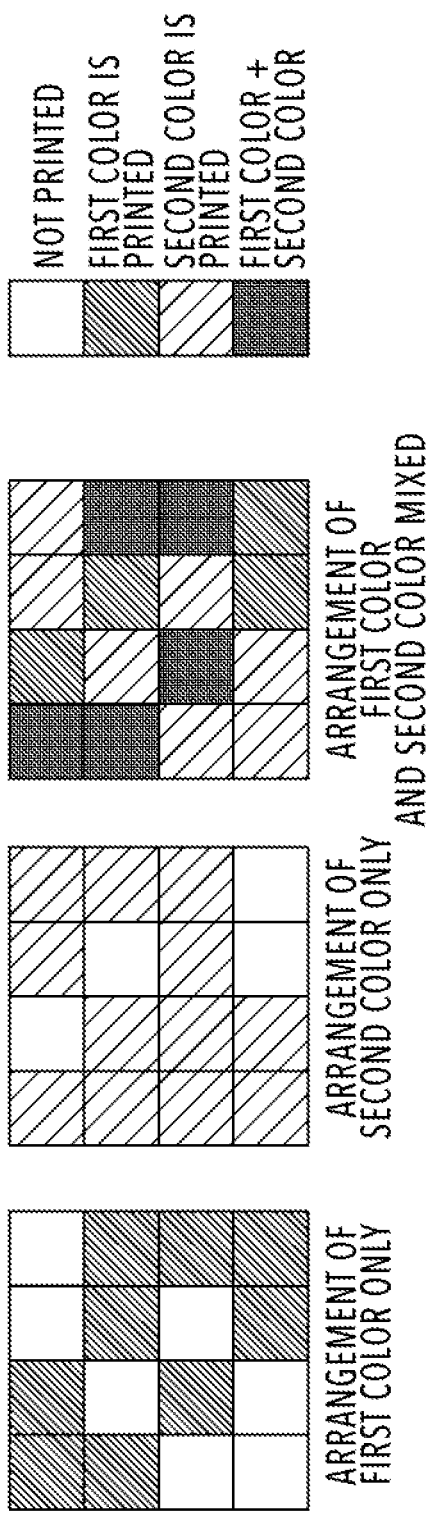
FIGS. 13A and 13B are diagrams that show dot arrangement states in "high-gradation processing;"
Figure 13B:
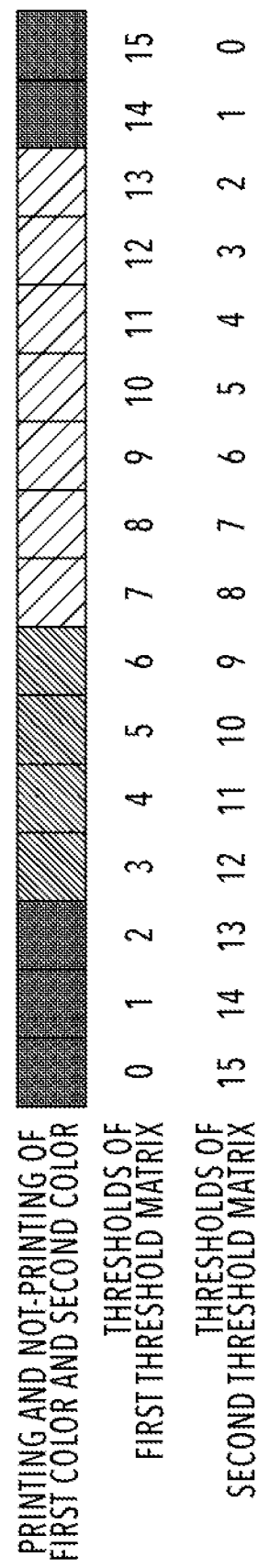

On the other hand, FIGS. 13A and 13B are diagrams that show dot arrangement states of the first color and the second color corresponding to thresholds in the "high-gradation processing." There is shown a case where the two threshold matrixes in the inverse relationship shown in FIG. 7 are used as the first threshold matrix and the second threshold matrix and the input gradation values are In1=9 and In2=12 (In1+In2=21>15).

Dots of the first color are separately printed in 0 to 6 and 14 to 15 in the first threshold matrix. Dots of the second color are separately printed in 0 to 8 (that are 7 to 15 in the first threshold matrix) and 13 to 15 (that are 0 to 2 in the first threshold matrix) in the second threshold matrix. Since the sum of In1 and In2 is greater than 100%, overlapping dots appear and they are separately printed in 0 to 2 and 14 to 15 in the first threshold matrix.

That is, overlapping dots having higher dot power than single-color dots of the first color and single-color dots of the second color are separately printed in a sequential area including the minimum value (0 to 2) and a sequential area including the maximum value (14 to 15). Consequently, all kinds of dots are arranged with high dispersibility, and a smooth image with no conspicuous granularity can be outputted.

Figure 14A:
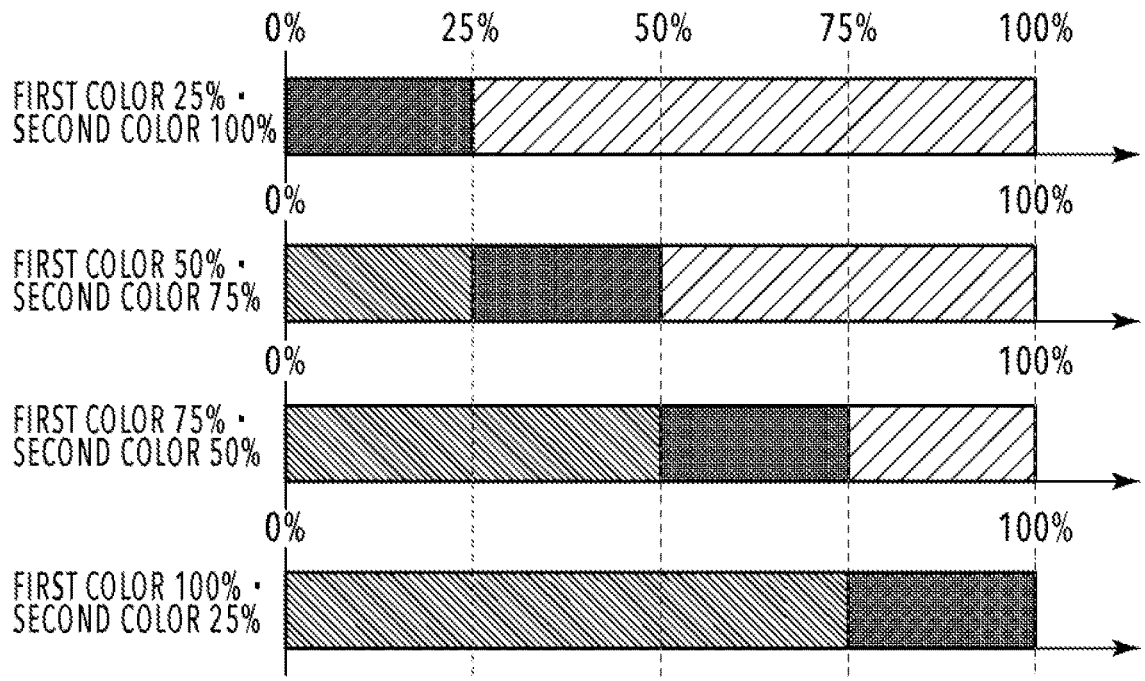
FIGS. 14A and 14B are diagrams for comparing dot printing states.
Figure 14B:
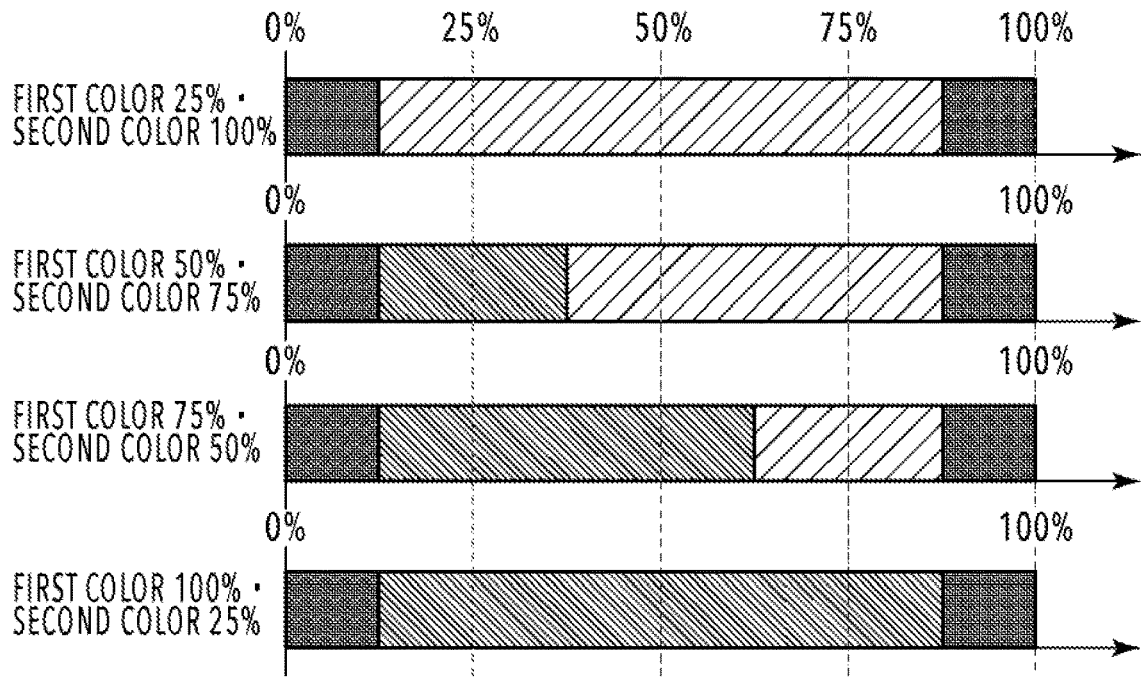
Figure 14B:
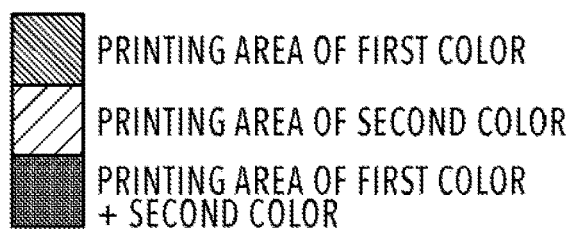

FIGS. 14A and 14B are diagrams for comparing dot printing states corresponding to thresholds in a case where the first gradation data In1 and the second gradation data In2 are varied in various ways. FIG. 14A shows a case of performing the "quantization processing of Expression (2)," and FIG. 14B shows a case of performing the quantization processing of this embodiment.

Both the diagrams show a case where combinations of the first input gradation value In1 and the second input gradation value In2 (In1, In2) are (25%, 100%) (50%, 75%) (75%, 50%) and (100%, 25%). That is, there are shown four cases where the overlapping area width In3 is 25%.

In the case of the "quantization processing of Expression (2)" shown in FIG. 14A, positions of the threshold area (pixel positions) in which the overlapping first color and second color are printed are displaced within the threshold matrix depending on the combination of the first input gradation value In1 and the second input gradation value In2. That is, the threshold area in which the overlapping first color and second color are printed is varied and not fixed in a sequential area including the minimum or maximum threshold, and a position in which the overlapping dot is actually printed is accordingly moved. Consequently, in the case of the "quantization processing of Expression (2)," it may be difficult to maintain the high dispersibility, and the granularity may become conspicuous.

In contrast, in the case of the quantization processing of this embodiment shown in FIG. 14B, the pixel positions (gradation area) in which the overlapping first color and second color are printed are stable within the threshold matrix even in the case where the first input gradation value In1 and the second input gradation value In2 are changed. That is, the pixel positions are fixed in a sequential area including the maximum threshold of the threshold matrix and a sequential area including the minimum threshold. Although the threshold areas (In4, In5) in which the overlapping dots are printed are expanded as the overlapping gradation area width In3 is increased, the separate printing in a threshold area including the maximum threshold of the threshold matrix and a threshold area including the minimum threshold is still performed. That is, in the case of performing the quantization processing of this embodiment, even if the first input gradation value In1 and the second input gradation value In2 are changed in various ways, the pixel positions in which the overlapping dots are printed are stable, and it is possible to print an image with high dispersibility and no conspicuous granularity.

The above-described difference between the cases of the "quantization processing of Expression (2)" and the quantization processing of this embodiment may be clearly seen in a case of, particularly, printing an image in which the hue and the density are periodically changed.

FIGS. 15A, 15B, 16A, and 16B are diagrams for comparing cases where the gradation values (In1, In2) having equal values are uniformly inputted to all the pixels included in a predetermined image area and cases where the gradation values are inputted to be varied depending on pixel positions. FIGS. 15A and 15B show cases of the "quantization processing of Expression (2)," and FIGS. 16A and 16B show cases of the quantization processing of this embodiment.

FIGS. 15A and 16A show results of quantization in a case where the input gradation values In1=67.5% and In2=67.5% are inputted to all the pixels included in a predetermined image area. On the other hand, FIGS. 15B and 16B show results of quantization in a case where the input gradation values In1 and In2 are periodically varied between 25% to 100% in a predetermined image area. The drawings each show first color printing pixels, second color printing pixels, and overlapping pixels in which the overlapping first color and second color are printed.

In FIG. 15A, the first color is printed in a sequential threshold area including the minimum threshold among all the thresholds arrayed in the first threshold matrix, and the second color is printed in a sequential threshold area including the maximum threshold among all the thresholds set in the first threshold matrix. Meanwhile, for the overlapping pixels, the overlapping first color and second color are printed in a middle threshold area of the entire threshold area, or an area including neither the minimum threshold nor the maximum threshold, as shown in FIG. 10B.

In FIG. 15B, the first color and the second color are printed at a uneven density based on the respective input gradation values. For the overlapping pixels, the overlapping first color and second color are printed while a threshold area including neither the minimum threshold nor the maximum threshold is variously shifted within the entire threshold area as shown in FIG. 14A.

In contrast, the threshold area of overlapping pixels in which the overlapping colors are printed in the case of employing the quantization processing of this embodiment is stable in both the case where the input gradation values of the first color and the second color are fixed as shown in FIG. 16A and case where the input gradation values of the first color and the second color are varied as shown in FIG. 16B. That is, as shown in FIG. 14B, the overlapping colors are printed in a sequential threshold area including the minimum threshold and a sequential threshold area including the maximum threshold, and consequently, dot arrangements in FIG. 16A and FIG. 16B are equal.

Figure 17:
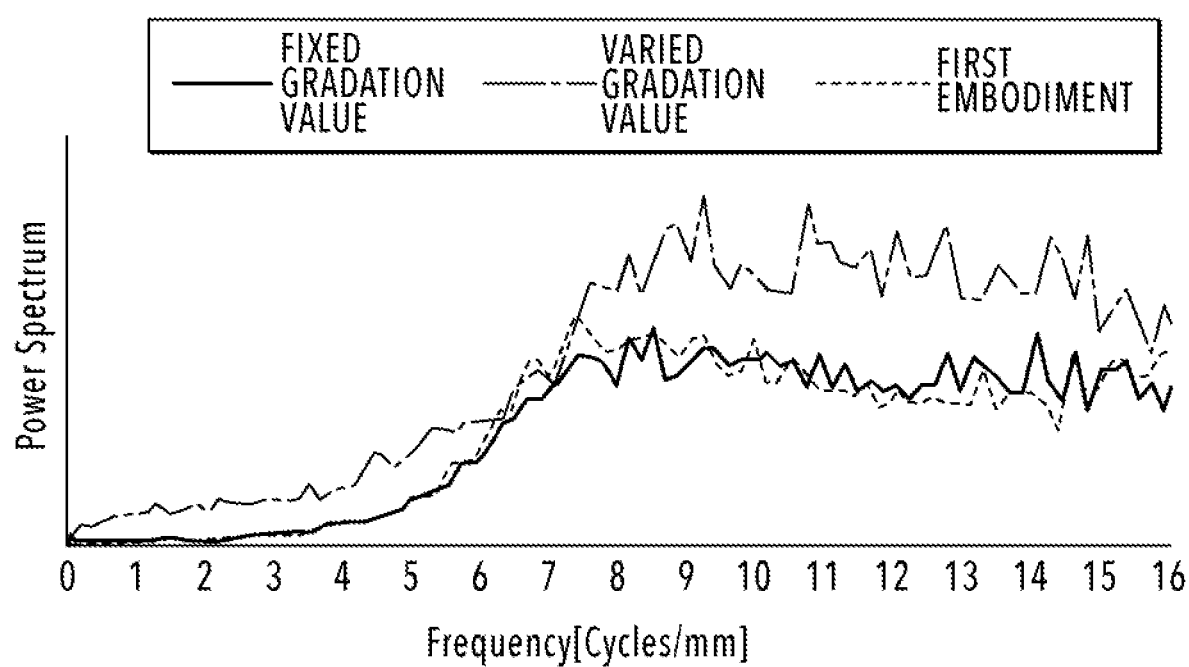
FIG. 17 is a diagram for comparing power distributions of spatial frequencies.

FIG. 17 is a diagram for comparing power distributions of spatial frequencies in distributions of the overlapping dots of the first and second color between the cases of FIGS. 15A, 15B, and 16B. In "quantization processing using inverse relationship," the power in the case where the gradation values of the first color and the second color are varied is increased in the entire area of frequency components including the low frequency components (varied gradation values) more than the case where the gradation values of the first color and the second color are fixed (fixed gradation values). In contrast, with the quantization processing of this embodiment (the present invention), the power is not increased even if the gradation values of the first color and the second color are varied, and the power distributions are almost equal to the case of (fixed gradation values).

In an actual image such as a photograph that is the target of printing by the printing apparatus, the input gradation data is varied within an image area in most cases. If the "quantization processing using inverse relationship" is employed in this case, the threshold area in which the overlapping dots are printed is varied as shown in FIGS. 14A, 15A, and 15B. This increases the power in the entire area of the spatial frequencies and the granularity may be conspicuous. In contrast, if the quantization processing of this embodiment is employed, the threshold area in which the overlapping dots are printed is stable as shown in FIGS. 14B, 16A, and 16B. This suppresses the power in the entire area of the spatial frequencies and an image with no conspicuous granularity can be obtained.

According to the above-described embodiment, for gradation data of the first color, quantization is performed according to the first threshold matrix having excellent dispersibility on a gradation area in which no overlapping dots appear. For gradation data of the first color, quantization is performed according to the second threshold matrix having the inverse relationship with the first threshold matrix on a gradation area in which no overlapping dots appear. For a gradation area in which overlapping dots of the first and second color appear, quantization is performed on a part of the gradation area according to the first threshold matrix, and quantization is performed on the rest part according to the second threshold matrix. According to this embodiment, it is possible to stably print the overlapping dots of the first and second color in a sequential threshold area including the minimum value and a sequential threshold area including the maximum value among the gradation area of the first threshold matrix regardless of gradation data of the first color and the second color. Consequently, it is possible to obtain high dispersibility in the entire image including overlapping dots regardless of gradation data and to print a smooth image with suppressed granularity.

Second Embodiment

The inkjet printing system shown in FIGS. 1 and 2 is also used in this embodiment.

Figure 18:
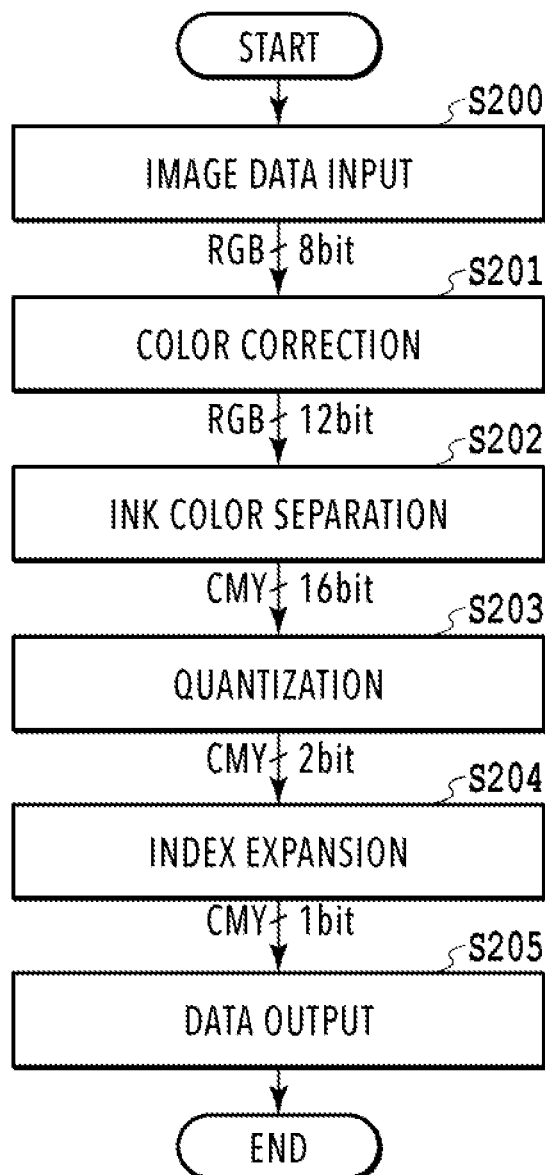
FIG. 18 is a flowchart for describing image processing of a second embodiment.

FIG. 18 is a flowchart for describing image processing executed by the image processing apparatus main control unit 108 of this embodiment. The flowchart of FIG. 18 is different from the flowchart of the first embodiment shown in FIG. 3 in that index expansion processing S204 is added. Hereinafter, the steps different from those of the first embodiment are described.

In step S202, the image processing apparatus main control unit 108 of this embodiment separates the converted RGB data into pieces of 16-bit gradation data (density data) of C (cyan), M (magenta), and Y (yellow), which are ink colors of the printing apparatus. In this stage, three channels (three colors) of 16-bit gray images are generated.

In step S203, the image processing apparatus main control unit 108 performs predetermined N-valued quantization processing on the pieces of 16-bit gradation data corresponding to the ink colors and generates quantized data of N gradation. In this embodiment, the data is quantized to three values, and pieces of 2-bit data of level 0 to level 2 (Lv0, Lv1, and Lv2) are generated based on the 16-bit gradation data.

In the following step S204, the image processing apparatus main control unit 108 performs the index expansion processing. Specifically, a dot arrangement pattern is selected in association with the level obtained in step S203 out of multiple dot arrangement patterns in which the number and positions of dots printed in the pixels are set in advance, and the selected dot arrangement pattern is generated as dot data. In this process, the dot arrangement patterns may be formed such that the number of dots printed in an area corresponding to pixels is different depending on the level value or may be formed such that the size of the dots is different depending on the level value.

In step S205, the image processing apparatus main control unit 108 outputs the dot data generated in S204. With that, the processing ends.

Figure 19:
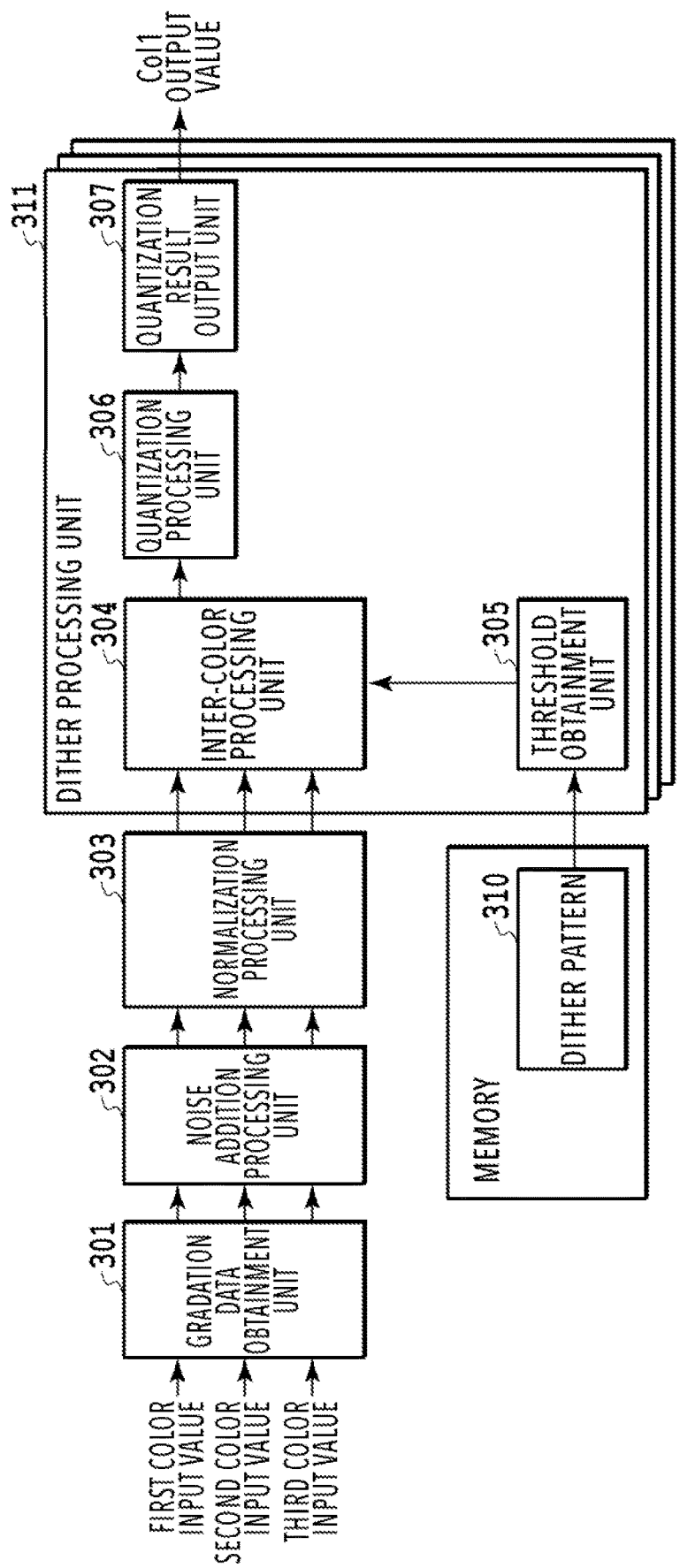
FIG. 19 is a block diagram of quantization processing of the second embodiment.

FIG. 19 is a block diagram for describing details of the quantization processing executed in step S203 in FIG. 18 of this embodiment. FIG. 19 is different from FIG. 4 described in the first embodiment in that a normalization processing unit 303 is added. Hereinafter, processes related to the normalization processing unit 303 are mainly described.

In this embodiment, the gradation data obtainment unit 301 obtains the 16-bit gradation data indicating density of each pixel, and the noise addition processing unit 302 adds predetermined noise to the 16-bit gradation data.

The normalization processing unit 303 associates the gradation value of each pixel represented by 16 bits with the number of gradations (number of levels) that allows for the index expansion in step S204 and thereafter normalizes a range of each level to 12 bits. A specific description is given below. In a case where the index expansion processing in step S204 is processing corresponding to N gradations (N is an integer of 3 or greater) of Lv0 to Lv(N−1), the normalization processing unit 303 divides 65536 gradations represented by 16 bits into (N−1) ranges. Additionally, the normalization processing unit 303 normalizes each range to 12 bits (4096 gradations). This makes it possible to obtain 12-bit data associated with any one of Lv0 to Lv(N−1) for each pixel. In a case where the input value is included in an M-th range in the order of low to high gradations out of the (N−1) ranges, the input value is quantized by the following quantization processing to either of a level value (M−1) (Lv(M−1)) or a level value M(LvM).

In this embodiment, since the index expansion processing corresponds to the three values of Lv0, Lv1, and Lv2, the normalization processing unit 303 equally divides 65536 gradations represented by 16 bits into two. Then, the normalization processing unit 303 normalizes gradation values 0 to 32767 and gradation values 32768 to 65535 to 12 bits (0 to 4095 gradations). Pixels of input gradation values 0 to 32767 as a first range are quantized to Lv0 or Lv1 by the following quantization processing, and pixels of input gradation values 32768 to 65535 as a second range are quantized to Lv1 or Lv2 by the following quantization processing.

The above-described processes by the sequential units from the gradation data obtainment unit 301 to the normalization processing unit 303 are parallel processed on the pieces of gradation data of different colors, and pieces of 12-bit data of cyan, magenta, and yellow are inputted to the dither processing unit 311.

Figure 20:
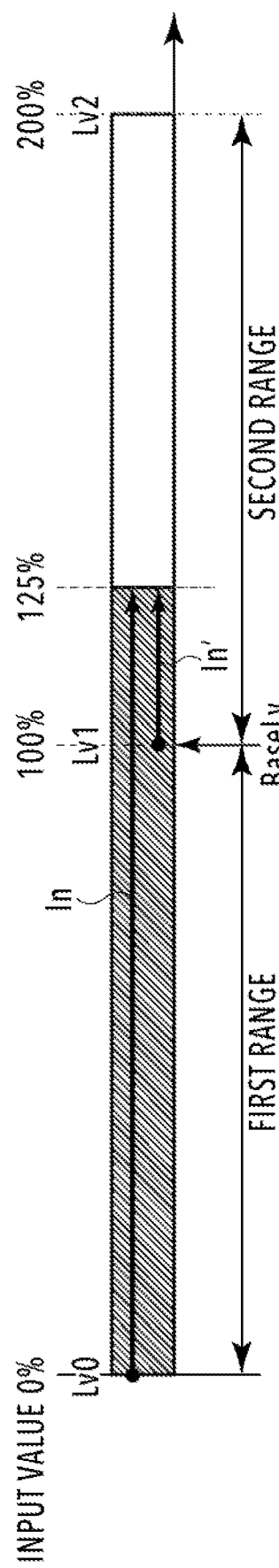
FIG. 20 is a schematic diagram for describing a concept of the quantization processing of the second embodiment.

FIG. 20 is a schematic diagram for describing the 16-bit input value inputted to the normalization processing unit 303 and a concept of the processes performed by the normalization processing unit 303 and the dither processing unit 311. In the case of normalizing 16 bits (0 to 65535) to the three values, the first range is from 0 to 32767 and the second range is from 32768 to 65535. The input gradation value In included in the first range is quantized to either of Lv0 and Lv1. The input gradation value In included in the second range is quantized to either of Lv1 and Lv2. In the following description, in each range, a smaller level value is called a quantization reference value BaseLv, and an amount of the input gradation value In that exceeds the quantization reference value BaseLv is called an intra-range gradation value In'.

In FIG. 20, the size of each range is 100%, and a range that may be occupied by the input gradation value In is 0 to 200%. There is shown a case of inputting In=125%. In this example, the input gradation value In is included in the second range, and the quantization reference value BaseLv corresponds to 100%. The intra-range gradation value In' is In'=In−100%=25%, and the input gradation value In is quantized to either of Lv1 and Lv2. The intra-range gradation value In' herein corresponds to the data that is normalized by the normalization processing unit 303.

In this embodiment, the quantization levels of the first color and the second color are determined in different ways depending on the magnitude relationship between a quantization reference value BaseLv1 of the first color and a quantization reference value BaseLv2 of the second color. Specifically, two comparative values Comp1A and Comp1B to be used for the quantization of the first color are set based on the magnitude relationship between the quantization reference value BaseLv1 of the first color and the quantization reference value BaseLv2 of the second color. Likewise, two comparative values Comp2A and Comp2B to be used for the quantization of the second color are set based on the magnitude relationship between the quantization reference value BaseLv1 of the first color and the quantization reference value BaseLv2 of the second color.

Figure 21A:
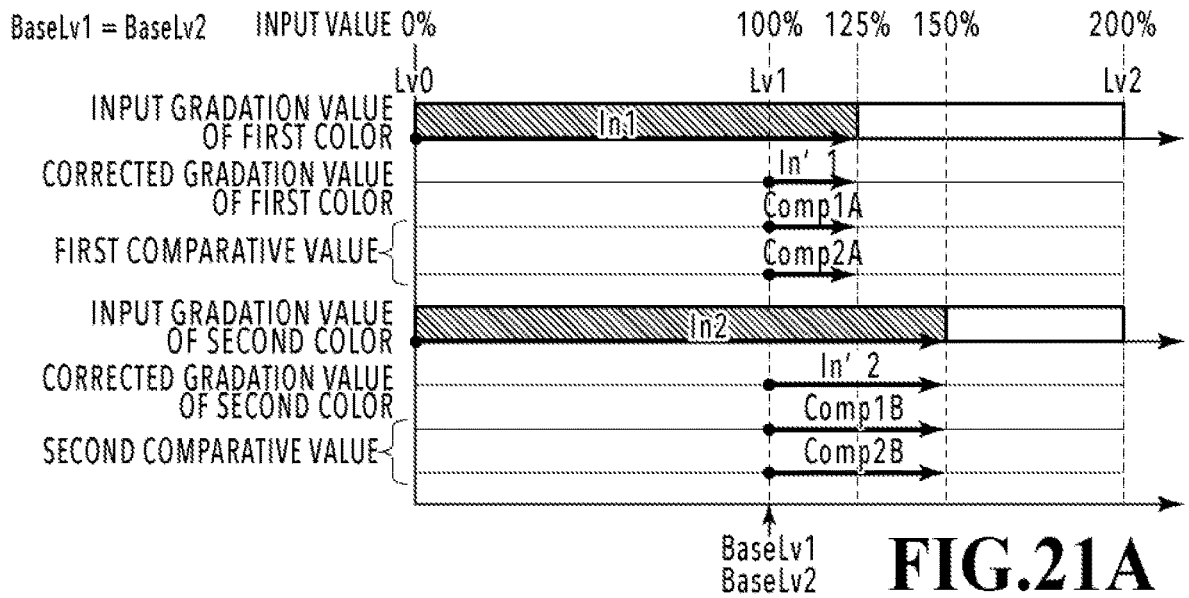
FIGS. 21A to 21C are diagrams for describing setting examples of comparative values.
Figure 21B:
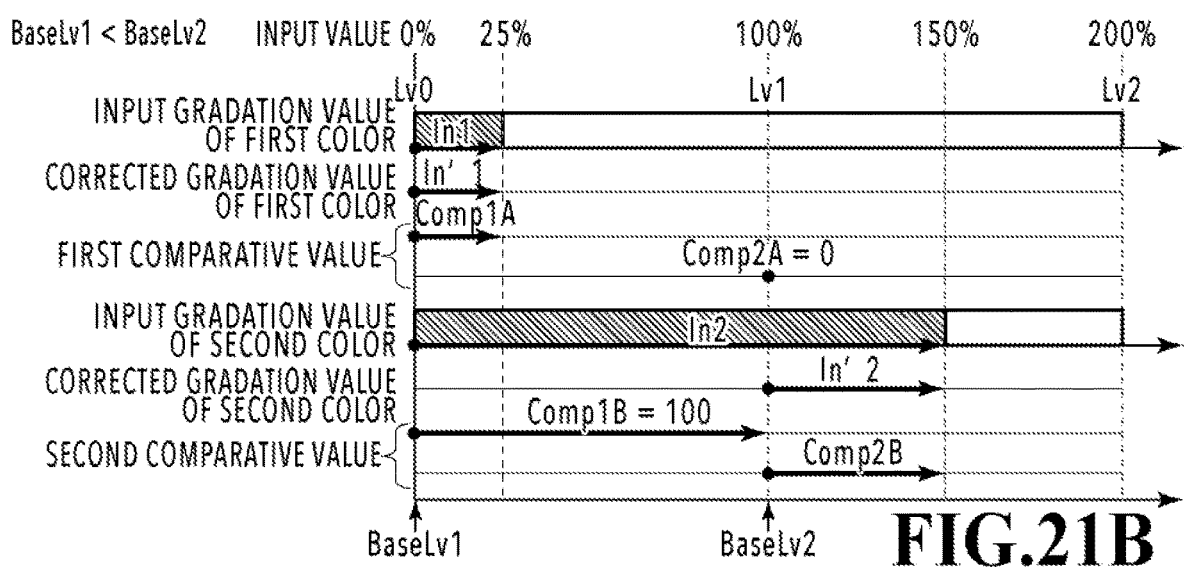
Figure 21C:
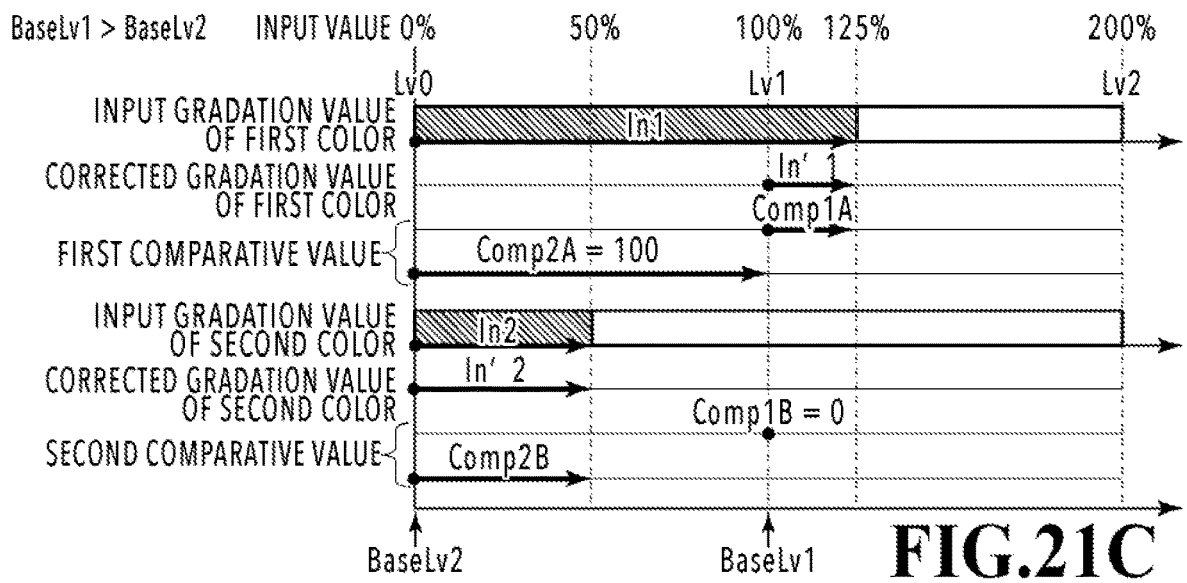

FIGS. 21A to 21C are diagrams for describing setting examples of the comparative values Comp1A, Comp1B, Comp2A, and Comp2B. FIG. 21A shows a case of BaseLv1=BaseLv2, FIG. 21B shows a case of BaseLv1<BaseLv2, and FIG. 21C shows a case of BaseLv1>BaseLv2. Descriptions are sequentially given below.

FIG. 21A shows a case where the input gradation value of the first color is In1=125% and the input gradation value of the second color is In2=150%. In this case, the quantization reference value and the intra-range gradation value of each color are BaseLv1=BaseLv2=1, In'1=25%, and In'2=50%.

In this embodiment, Comp1A in any condition is Comp1A=In'1. Additionally, Comp2B in any condition is Comp2B=In'2.

On the other hand, Comp1B is the input gradation value In2 (In'2) of the second color in a range including the input gradation value In1 of the first color. That is, if BaseLv1 and BaseLv2 have equal values like FIG. 21A, Comp1B=In'2. Additionally, Comp2A is the input gradation value In1 (In'1) of the first color in a range including the input gradation value In2 of the second color. That is, if BaseLv1 and BaseLv2 have equal values like FIG. 21A, Comp2A=In'1.

FIG. 21B shows a case where the input gradation value of the first color is In1=25% and the input gradation value of the second color is In2=150%. In this case, the quantization reference value and the intra-range gradation value of each color are BaseLv1=0, BaseLv2=1, In'1=25%, and In'2=50%. The intra-range gradation value In'2 of the second color in the first range including the input gradation value In1 of the first color is 100%, and the intra-range gradation value In'1 of the first color in the second range including the input gradation value In2 of the second color is 0%. Thus, the four comparative values are Comp1A=25%, Comp1B=100%, Comp2A=0%, and Comp2B=In'2.

FIG. 21C shows a case where the input gradation value of the first color is In1=125% and the input gradation value of the second color is In2=50%. In this case, the quantization reference value and the intra-range gradation value of each color are BaseLv1=1, BaseLv2=0, In'1=25%, and In'2=50%. The intra-range gradation value In'2 of the second color in the second range including the input gradation value In1 of the first color is 0%, and the intra-range gradation value In'1 of the first color in the first range including the input gradation value In2 of the second color is 100%. Thus, the four comparative values are Comp1A=25%, Comp1B=0%, Comp2A=100%, and Comp2B=In'2.

FIG. 22 shows the above-described correspondence between magnitude relationship between the quantization reference values and the four comparative values Comp1A, Comp1B, Comp2A, and Comp2B.

Figure 23:
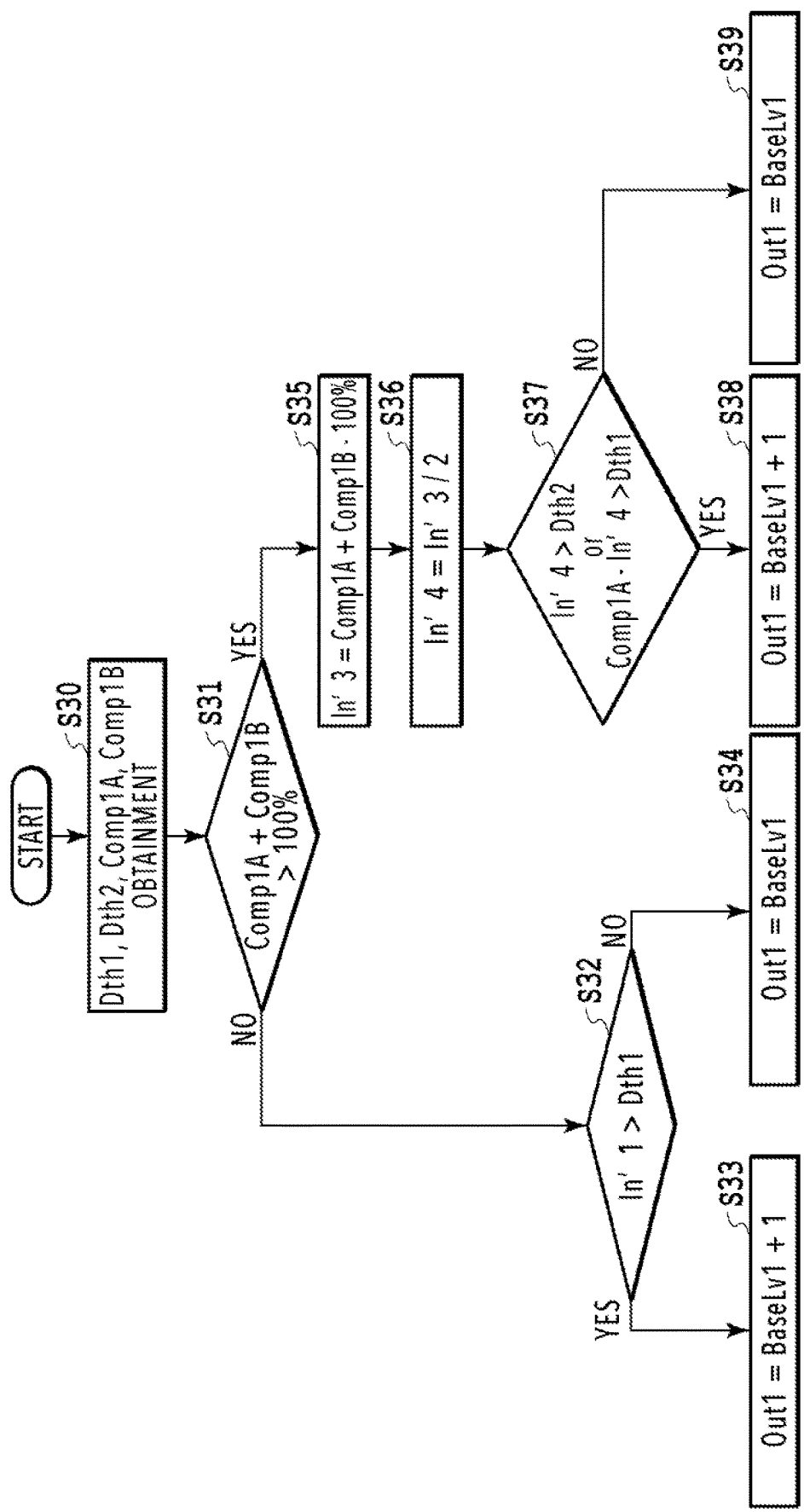
FIG. 23 is a flowchart of quantization processing of a first color of the second embodiment.

FIG. 23 is a flowchart for describing the processing for the quantization of the first color executed by the dither processing unit 311 of this embodiment. Once the processing starts, first, in S30, the dither processing unit 311 obtains the threshold Dth1 of the first threshold matrix, the threshold Dth2 of the second threshold matrix, and the two comparative values Comp1A and Comp1B. Dth1 and Dth2 may be thresholds for the processing-target pixel respectively read from the thresholds arrayed in the first threshold matrix and the second threshold matrix. The comparative values Comp1A and Comp1B may be set according to the table shown in FIG. 22 using the input gradation values In1 and In2 inputted by the normalization processing unit 303. Note that, like the first embodiment, the first threshold matrix and the second threshold matrix have the inverse relationship.

In S31, the dither processing unit 311 determines whether the following inequality is true:

Comp1$A$+Comp1$B$>100%.

If it is determined that the above inequality is not true, the process proceeds to S32, and if it is determined that the above inequality is true, the process proceeds to S35.

The processes in S32 and following steps are for performing the quantization on the first color with the first threshold matrix. That is, the intra-range gradation value In'1 of the first color is compared with the threshold Dth1 of the first threshold matrix, and if In'1>Dth1, the process proceeds to S33 and the quantization level of the first color is set to BaseLv1+1. If In'1≤Dth1, the process proceeds to S34 and the quantization level of the first color is set to BaseLv1.

On the other hand, the processes in S35 and following steps are for performing the characteristic quantization of the present invention on the first color. In S35, the dither processing unit 311 obtains an overlapping correction gradation area width In'3. The overlapping correction gradation area width In'3 corresponds to a width of the threshold area in which both the first color and second color are printed and can be expressed by the following expression:

In'3=Comp1$A$+Comp1$B$−100%.

Additionally, in S36, the dither processing unit 311 equally divides the overlapping correction gradation area width In'3 into two to calculate a first overlapping area width In'4:

In'4=In'3/2.

If the thus-obtained value includes a fraction, it is cut off to obtain In'4.

In S37, the dither processing unit 311 determines whether the first overlapping area width In'4 satisfies In'4>Dth2 (Condition 4) or Comp1A−In'4>Dth1 (Condition 5). If the first overlapping area width In'4 satisfies either of Condition 4 and Condition 5, the process proceeds to S38 and the quantization level (Out1) of the first color in the processing-target pixel is set to BaseLv1+1. The pixel satisfying Condition 4 is a pixel in which both the first and second colors are printed at the same quantization level according to the second threshold matrix, and the pixel satisfying Condition 5 is a pixel in which the quantization level of the first color has a higher level value than the quantization level of the second color for the printing. In S37, if the first overlapping area width In'4 satisfies neither Condition 4 nor Condition 5, the process proceeds to S39 and the quantization level (Out1) of the first color in the processing-target pixel is set to BaseLv1.

Figure 24:
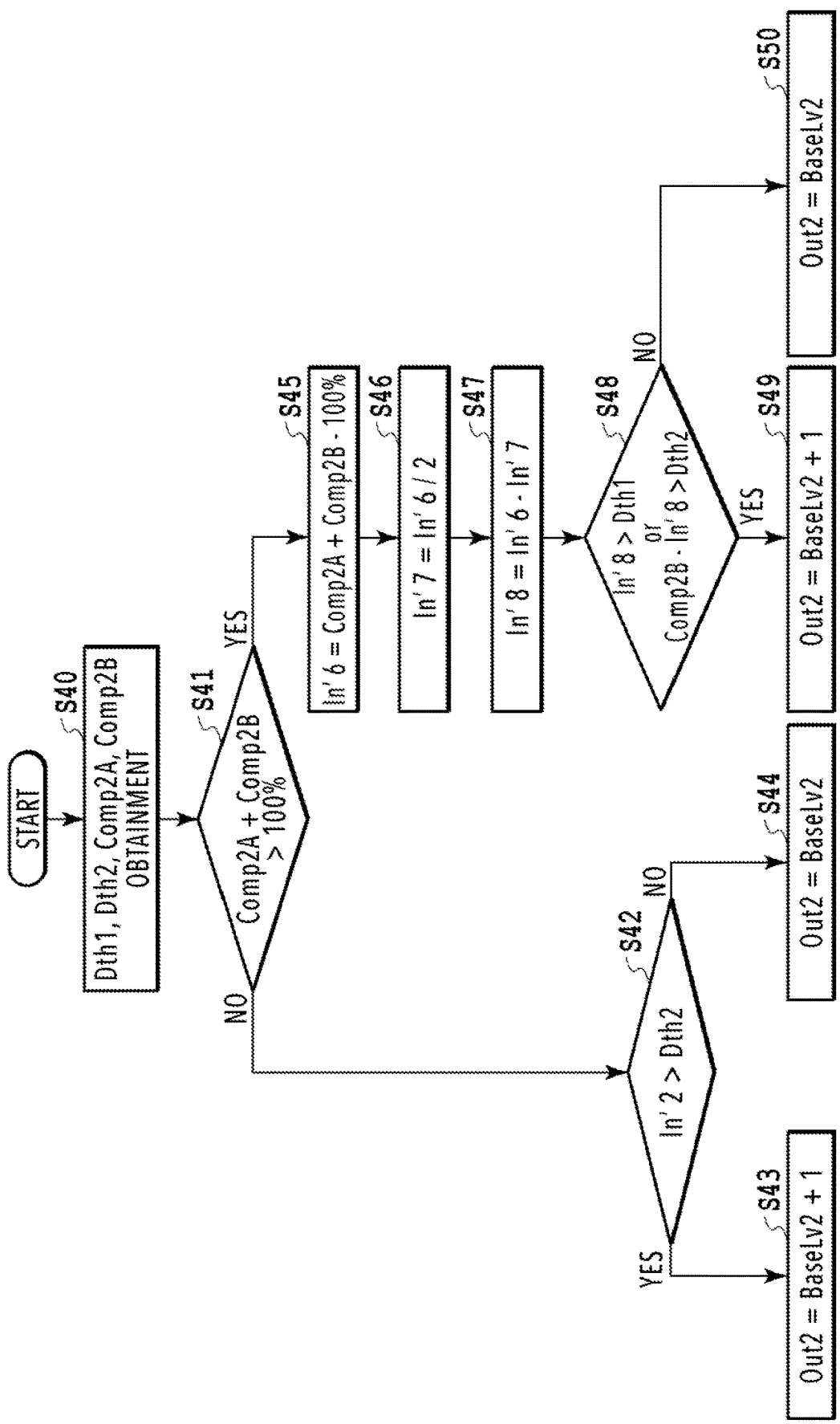
FIG. 24 is a flowchart of quantization processing of a second color of the second embodiment.

FIG. 24 is a flowchart for describing the processing for the quantization of the second color executed by the dither processing unit 311 of this embodiment. Once the processing starts, first, in S40, the dither processing unit 311 obtains the threshold Dth1 of the first threshold matrix, the threshold Dth2 of the second threshold matrix, and the two comparative values Comp2A and Comp2B. Dth1 and Dth2 may be thresholds for the processing-target pixel respectively read from the thresholds arrayed in the first threshold matrix and the second threshold matrix. The comparative values Comp2A and Comp2B may be set according to the table shown in FIG. 22 using the input gradation values In1 and In2 inputted by the normalization processing unit 303. Note that, like the first embodiment, the first threshold matrix and the second threshold matrix have the inverse relationship.

In S41, the dither processing unit 311 determines whether the following inequality is true:

Comp2$A$+Comp2$B$>100%.

If it is determined that the above inequality is not true, the process proceeds to S42, and if it is determined that the above inequality is true, the process proceeds to S45.

The processes in S42 and following steps are for performing the quantization on the second color with the second threshold matrix. That is, the intra-range gradation value In'2 of the second color is compared with the threshold Dth2 of the second threshold matrix, and if In'2>Dth2, the process proceeds to S43 and the quantization level of the second color is set to BaseLv2+1. If In'2≤Dth2, the process proceeds to S44 and the quantization level of the second color is set to BaseLv2.

On the other hand, the processes in S45 and following steps are for performing the characteristic quantization of the present invention on the second color. In S45, the dither processing unit 311 obtains an overlapping correction gradation area width In'6. The overlapping correction gradation area width In'6 corresponds to a width of the threshold area in which both the first color and second color are printed and can be expressed by the following expression:

In'6=Comp2A+Comp2B−100%.

In S46, the dither processing unit 311 equally divides the overlapping correction gradation area width In'6 into two to calculate a third overlapping area width In'7:

In'7=In'3/2.

If the thus-obtained value includes a fraction, it is cut off to obtain In'7.

Additionally, in S47, the dither processing unit 311 subtracts the third overlapping area width In'7 from the overlapping correction gradation area width In'6 to calculate a fourth overlapping area width In'8:

$$In'8=In'6-In'7$$

The fraction that is cut off in the division in S46 is included in the fourth overlapping area width In'8.

In following S48, the dither processing unit 311 determines whether the fourth overlapping area width In'8 satisfies In'8>Dth1 (Condition 6) or Comp2B−In'8>Dth2 (Condition 7). If the fourth overlapping area width In'8 satisfies either of Condition 6 and Condition 7, the process proceeds to S49 and the quantization level (Out2) of the second color in the processing-target pixel is set to BaseLv2+1. The pixel satisfying Condition 6 is a pixel in which both the first and second colors are printed at the same quantization level according to the first threshold matrix, and the pixel satisfying Condition 7 is a pixel in which the quantization level of the second color has a higher level value than the quantization level of the first color for the printing. In S48, if the fourth overlapping area width In'8 satisfies neither Condition 6 nor Condition 7, the process proceeds to S50 and the quantization level (Out2) of the second color in the processing-target pixel is set to BaseLv2.

Hereinafter, with reference to FIGS. 23 and 24 again, descriptions are given for each case of FIGS. 21A to 21C assuming that pieces of gradation data having the same values are uniformly inputted in a relatively large image area. In the case of BaseLv1=BaseLv2, the pixel in which the first color is printed and the pixel in which the second color is printed in the same range are arranged like the first embodiment. For example, in the case of BaseLv1=BaseLv2=1 as shown in FIG. 21A, while the first and second colors are uniformly printed at the quantization level Lv1 in the entire pixel area, the first and second colors of Lv2 are exclusively printed in a relatively low gradation, and printing of almost half of overlapping pixels is made according to the first threshold matrix and printing of the other half of the overlapping pixels is made according to the second threshold matrix in a relatively high gradation.

In a case of BaseLv1=BaseLv2=0, the first and second colors of Lv1 are exclusively printed in a blank area in a relatively low gradation, and printing of almost half of overlapping pixels is made according to the first threshold matrix and printing of the other half of the overlapping pixels is made according to the second threshold matrix in a relatively high gradation.

In the case of BaseLv1<BaseLv2 shown in FIG. 21B, while the second color is uniformly printed at the quantization level Lv1 or Lv2 in the entire pixel area, the first color of Lv1 is printed to overlap the second color, and overlapping pixels are thus formed. In this case, for the first color, since Comp1B is set to 100% according to FIG. 22, S31 in FIG. 23 is inevitably Yes and the process proceeds to S35. Then, in the following processes, printing of almost half of the overlapping pixels is made according to the second threshold matrix (Condition 4) with high dispersibility, and printing of the other half of the overlapping pixels is made according to the first threshold matrix (Condition 5) with high dispersibility. On the other hand, for the second color of Lv2, since Comp2A is set to 0% according to FIG. 22, S41 in FIG. 24 is inevitably No and the process proceeds to S42 to make printing according to the second threshold matrix.

In the case of BaseLv1>BaseLv2 shown in FIG. 21C, while the first color is uniformly printed at the quantization level Lv1 or Lv2 in the entire pixel area, the second color of Lv1 is printed to overlap the first color, and overlapping pixels are thus formed. In this case, for the first color, since Comp1B is set to 0% according to FIG. 22, S31 in FIG. 23 is inevitably No and the process proceeds to S32 to make printing according to the first threshold matrix. On the other hand, for the second color of Lv2, since Comp2A is set to 100% according to FIG. 22, S41 in FIG. 24 is inevitably Yes and the process proceeds to S45. Then, in the following processes, printing of almost half of the overlapping pixels is made according to the first threshold matrix (Condition 6) with high dispersibility, and printing of the other half of the overlapping pixels is made according to the second threshold matrix (Condition 7) with high dispersibility.

According to the above-described embodiment, in any cases of FIGS. 21A to 21C, it is possible to print almost half of the overlapping pixels of the first and second colors according to the first threshold matrix and to print the other half of the overlapping pixels of the first and second colors according to the second threshold matrix.

That is, according to this embodiment, in the printing pixels having multiple quantization levels, the quantization processing according to a sequential gradation area including the minimum threshold and a sequential gradation area including the maximum threshold can be performed on a pixel having higher quantization level (i.e., pixel having higher dot power). Consequently, this makes it possible to obtain a smooth image with no conspicuous granularity in a wide range of gradation areas expressed by multiple quantization levels.

Third Embodiment

The similar inkjet printing system as that of the second embodiment is also used in this embodiment, and image processing is performed in accordance with the flowcharts in FIGS. 18, 23 and 24 like the second embodiment. The difference between this embodiment and the second embodiment is a setting method of the four comparative values Comp1A, Comp1B, Comp2A and Comp2B.

FIG. 25 shows correspondence between the magnitude relationship between the quantization reference values and the four comparative values Comp1A, Comp1B, Comp2A and Comp2B of this embodiment. In this embodiment, Comp1A=In'1, Comp1B=In'2, Comp2A=In'1, and Comp2B=In'2 in the case of BaseLv1=BaseLv2, and Comp1A=In'1, Comp1B=0%, Comp2A=0%, and Comp2B=In'2 in the case of BaseLv1≠BaseLv2.

According to this embodiment, in the case of BaseLv1≠BaseLv2, the process always proceeds to S32 in FIG. 23 and the first color is quantized with the first threshold matrix, while the process always proceeds to S42 in FIG. 24 and the second color is quantized with the second threshold matrix. Thus, in the case of BaseLv1<BaseLv2, all of the overlapping pixels are arranged using the first threshold matrix, and in the case of BaseLv1>BaseLv2, all of the overlapping pixels are arranged using the second threshold matrix. That is, in the case of BaseLv1≠BaseLv2 in this embodiment, overlapping pixels are arranged according to either of the first threshold matrix and the second threshold matrix. Even in this case, it is still possible to sufficiently suppress the granularity more than the conventional configuration in which overlapping pixels include neither the minimum threshold nor the maximum threshold and sequential threshold areas are unstable depending on the gradation values of the first color and the second color. Additionally, according to this embodiment, it is possible to reduce the number of computations in S35 and following steps in FIG. 23 and the number of computations in S45 and following steps in FIG. 24, and the quantization processing can be performed faster than the second embodiment.

Fourth Embodiment

In the above-described embodiments, a gradation value of the second color is corrected (shifted) with a predetermined method and compared with a fixed threshold in order to arrange overlapping pixels of the first and second color according to the order of the first threshold matrix. In contrast, in this embodiment, a threshold is corrected (shifted) in order to obtain the same effects as the above-described embodiments.

Figure 26:
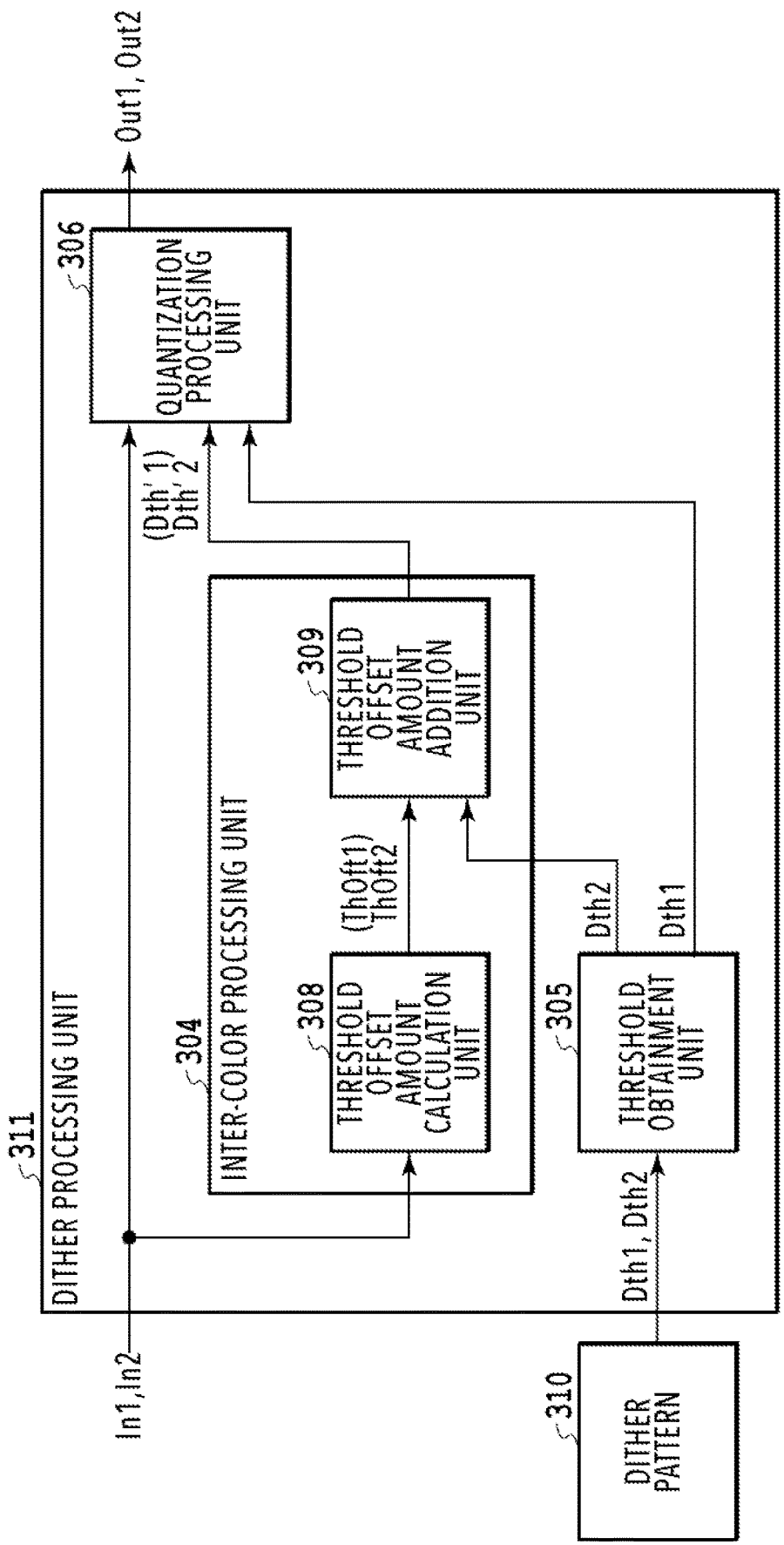
FIG. 26 is a block diagram of quantization processing of a fourth embodiment.

FIG. 26 is a block diagram for describing a control configuration of a dither processing unit 311 employed for this embodiment. In this embodiment, configurations of the dither pattern 310 and the threshold obtainment unit 305 are the same as those of the above-described embodiments. That is, the dither pattern 310 stores the first threshold matrix having blue noise characteristics and the second threshold matrix having the inverse relationship with the first threshold matrix. The threshold obtainment unit 305 obtains the thresholds Dth1 and Dth2 corresponding to the processing-target pixel respectively from the thresholds arrayed in the first threshold matrix and the second threshold matrix and transmits the thresholds Dth1 and Dth2 to a threshold offset amount addition unit 309.

The inter-color processing unit 304 of this embodiment includes a threshold offset amount calculation unit 308 and the threshold offset amount addition unit 309. The threshold offset amount calculation unit 308 calculates a threshold offset amount ThOft1 or ThOft2 as a correction amount for correcting a threshold based on the input gradation values In1 and In2 of the first and second colors and transmits the threshold offset amount ThOft1 or ThOft2 to the threshold offset amount addition unit 309. The threshold offset amount addition unit 309 adds the threshold offset amount ThOft1 or ThOft2 received from the threshold offset calculation unit 308 to the threshold received from the threshold obtainment unit 305 to obtain a corrected threshold Dth'1 for the first color or a corrected threshold Dth'2 for the second color, and transmits the obtained value to the quantization processing unit 306. The quantization processing unit 306 compares the input gradation value In1 of the first color or the input gradation value In2 of the second color with the corrected threshold Dth'1 for the first color or the corrected threshold Dth'2 for the second color to determine the quantization level, and outputs the determined quantization level.

Figure 27:
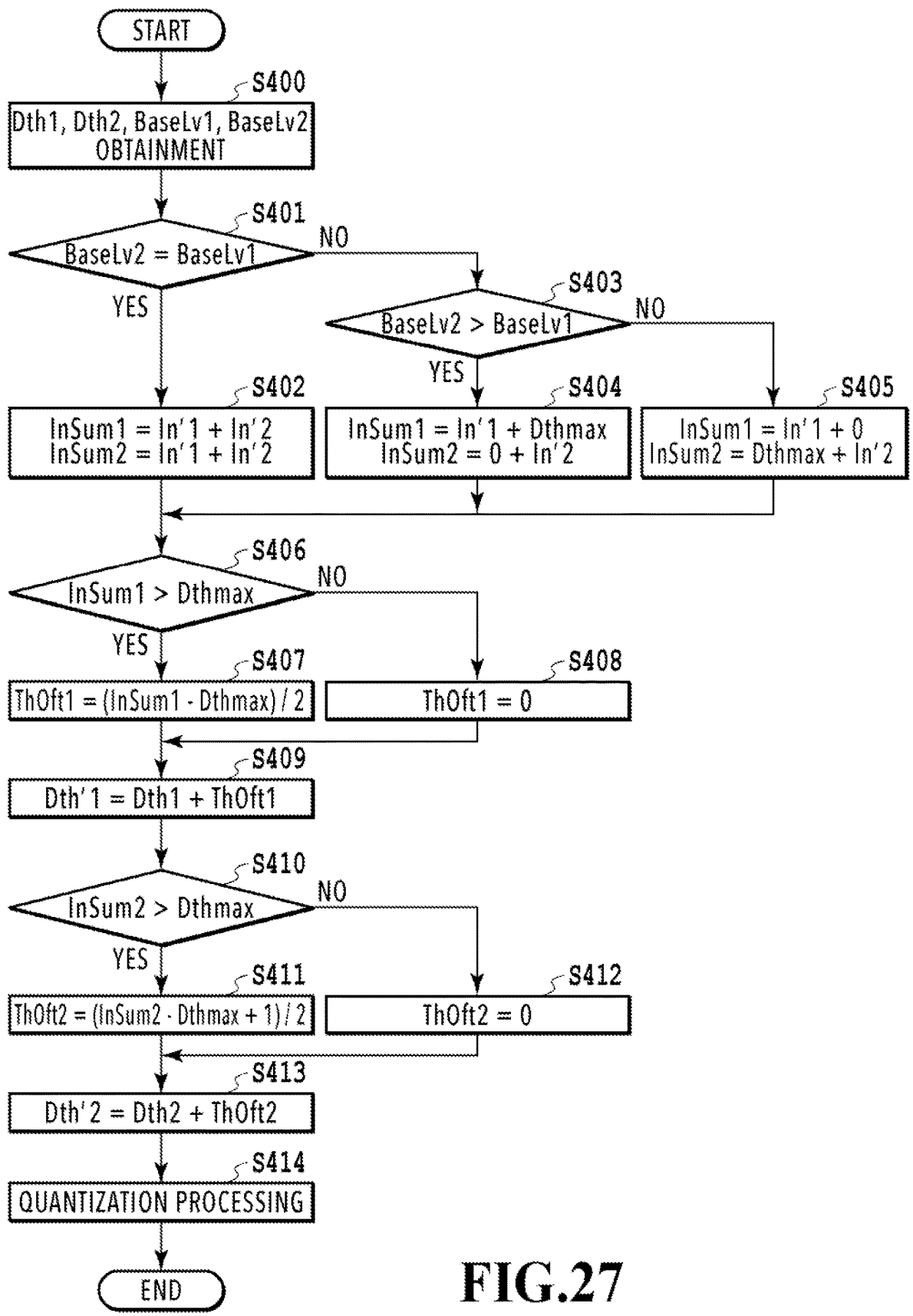
FIG. 27 is a flowchart of the quantization processing of the fourth embodiment.
Figures 28A, 28B, 28C:
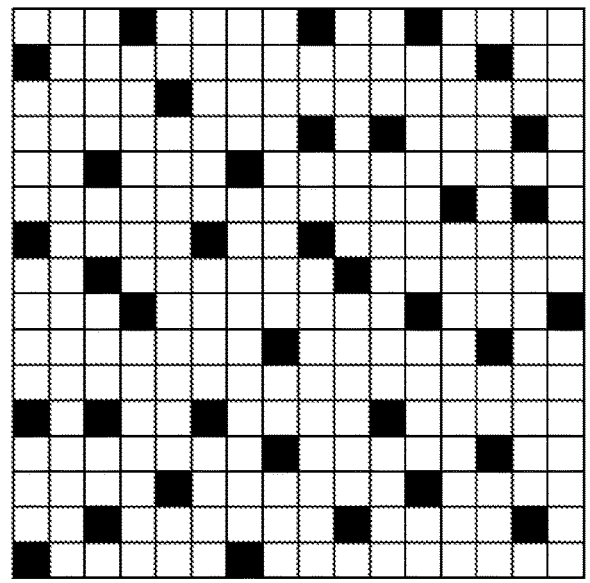
FIGS. 28A to 28C are diagrams that show a threshold matrix having blue noise characteristics.
Figure 29A:
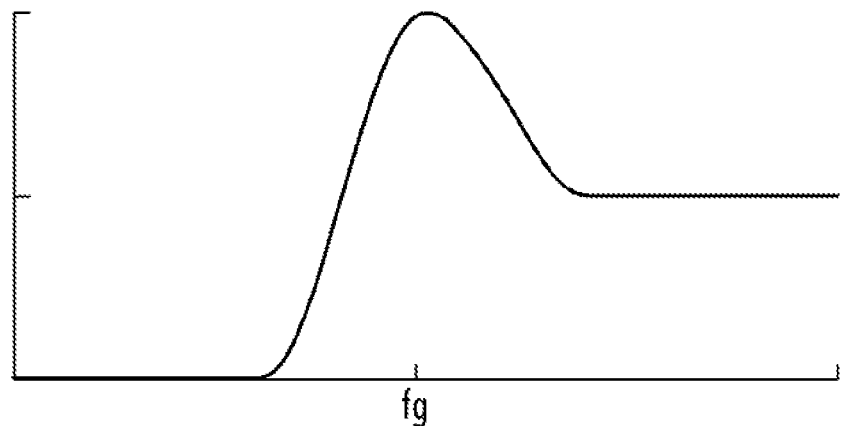
FIGS. 29A and 29B are diagrams that show blue noise characteristics and visual properties of human.
Figure 29B:
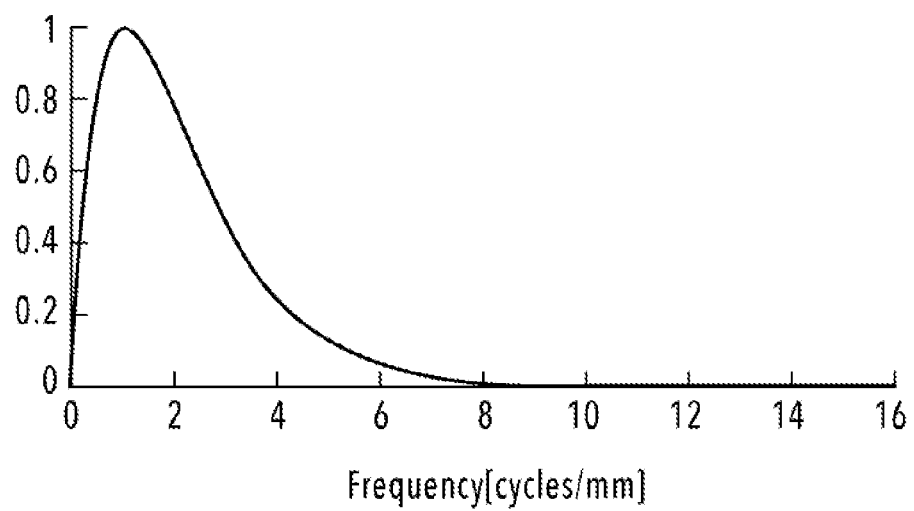

FIG. 27 is a flowchart for describing the processing for the quantization of the input gradation value In1 of the first color and the gradation value In2 of the second color in the processing-target pixel executed by the dither processing unit 311 of this embodiment. Once the processing starts, first, in S400, the dither processing unit 311 obtains the threshold Dth1 of the first threshold matrix, the threshold Dth2 of the second threshold matrix, and the quantization reference values BaseLv1 and BaseLv2 of the first and second colors. Dth1 and Dth2 may be thresholds for the processing-target pixel respectively read from the thresholds arrayed in the first threshold matrix and the second threshold matrix. The quantization reference values BaseLv1 and BaseLv2 are obtained based on the input gradation values In1 and In2 of the first and second colors like the second embodiment.

S401 to S405 are steps for calculating an input addition value InSum according to the following expressions based on the magnitude relationship between BaseLv1 and BaseLv2:

in the case of BaseLv1=BaseLv2 (S402), $InSum1 = In'1 + In'2$, and $InSum2 = In'1 + In'2$;

in the case of BaseLv1<BaseLv2 (S404), $InSum1 = In'1 + Dthmax$, and $InSum2 = 0 + In'2$; and in the case of BaseLv1≥BaseLv2 (S405), $InSum1 = In'1 + 0$, $InSum2 = Dthmax + In'2$, where Dthmax is the maximum value of the thresholds arrayed in the threshold matrix, and Dthmax=4095 in this embodiment.

In the following processes, S406 to S409 are steps for obtaining the corrected threshold Dth'1 for the first color (hereinafter, first corrected threshold), and S410 to S413 are steps for obtaining the corrected threshold Dth'2 for the second color (hereinafter, second corrected threshold).

In S406, if InSum1>Dthmax is true, the dither processing unit 311 allows the process to proceed to S407 and calculates the first threshold offset amount ThOft1 according to the following expression:

$ThOft1 = (InSum1 - Dthmax)/2.$

If the thus-obtained value includes a fraction, it is cut off to obtain ThOft1.

On the other hand, if InSum1>Dthmax is not true, the process proceeds to S408 and the first threshold offset amount ThOft1 is set to 0.

In S409, the dither processing unit 311 adds the first threshold offset amount ThOft1 to the threshold Dth1 of the first color obtained in S400 and obtains the first corrected threshold Dth'1:

$Dth'1 = Dth1 + ThOft1.$

In S410, if InSum2>Dthmax is true, the dither processing unit 311 allows the process to proceed to S411 and calculates the second threshold offset amount ThOft2 according to the following expression:

$ThOft2 = (InSum2 - Dthmax + 1)/2.$

If the thus-obtained value includes a fraction, it is cut off to obtain ThOft2.

On the other hand, if InSum2>Dthmax is not true, the process proceeds to S412 and the second threshold offset amount ThOft2 is set to 0.

In S413, the dither processing unit 311 adds the second threshold offset amount ThOft2 to the threshold Dth2 of the second color obtained in S400 and obtains the second corrected threshold Dth'2:

$$Dth'2=Dth2+ThOft2.$$

In S414, the dither processing unit 311 performs the quantization processing on the first color and the second color. That is, the quantization level of the first color is set by comparing In'1 with Dth'1, and the quantization level of the second color is set by comparing In'2 with Dth'2. In this process, for the first color, if Dth'1 calculated in S409 is equal to or smaller than Dthmax, the quantization level is directly set by comparing In'1 with Dth'1. On the other hand, if Dth'1 is greater than Dthmax, a value obtained by subtracting Dthmax+1 from Dth'1 is set as new Dth'1, and the quantization level is set by comparing this new Dth'1 with In'1.

For the second color, if Dth'2 calculated in S413 is equal to or smaller than Dthmax, the quantization level is directly set by comparing In'2 with Dth'2. On the other hand, if Dth'2 is greater than Dthmax, a value obtained by subtracting Dthmax+1 from Dth'2 is set as new Dth'2, and the quantization level is set by comparing this new Dth'2 with In'2. With that, the processing ends.

According to the above-described embodiment, it is possible to obtain the similar effect as that of the second embodiment by correcting (shifting) a threshold instead of an input gradation value. Although the described method is a method enabling the quantization processing equivalent to that of the second embodiment, such a "method of correcting a threshold" can be also applied to the first and third embodiments, and the similar effects as those of the embodiments can be obtained. Additionally, the circuit for implementing this embodiment having the control configuration shown in FIG. 26 can be smaller than the circuits for correcting an input gradation value of the first to third embodiments, and thus the cost of the apparatus can be reduced.

Other Embodiments

Although the case where the first color is cyan and the second color is magenta is described as an example, it is needless to say that the present invention is not limited to this combination. In the quantization processing of the above-described embodiments, the case where the first color and the second color have equal dot powers is described. It is preferable to set a color having lower lightness and higher dot power to the first color on which the quantization processing according to the threshold matrix can be preferentially performed, and if the dot power of magenta is higher than that of cyan, the first color may be magenta and the second color may be cyan. Otherwise, it is possible to set cyan or magenta to either one of the first and second colors and replace the other one with a different color such as yellow, and this may also be applied to a case of using an ink of different hue such as red, blue, green, black, and so on.

Although the case of using the inkjet printing apparatus is described as an example, the present invention is not limited thereto. A different type of printing apparatus can exert the effects of the present invention as long as it is a color printing apparatus capable of making pseudo-gradation expression by printing dots.

The present invention may be implemented by processing that is executed such that a program implementing one or more functions of the above-described embodiments is supplied to a system or an apparatus through a network or a storage medium and one or more processors in a computer of the system or the apparatus read the program. Otherwise, the present invention may be implemented by a circuit implementing one or more functions (e.g., ASIC).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-145330 filed Aug. 1, 2019, which is hereby incorporated by reference wherein in its entirety.

What is claimed is:

1. An image processing apparatus, comprising:
one or more processors; and
one or more non-transitory computer-readable media storing computer-executable instructions that cause the one or more processors to function as:
a gradation data obtainment unit configured to obtain first gradation data corresponding to a gradation value of a first color and second gradation data corresponding to a gradation value of a second color for a processing-target pixel;
a threshold obtainment unit configured to obtain a first threshold for the processing-target pixel from a first threshold matrix including a plurality of arrayed thresholds for pixels and obtain a second threshold for the processing-target pixel from a second threshold matrix in which the thresholds for the pixels are arrayed at such pixel positions that order of the pixel positions is inverse to order of pixel positions in the first threshold matrix in a case where the pixel positions are arranged in ascending order of the thresholds; and
a quantization processing unit configured to quantize the first gradation data, and the second gradation data to generate first quantization data and second quantization data that have a smaller number of gradations than the number of gradations of the first gradation data and the second gradation data based on the first threshold, the second threshold, the first gradation data, and the second gradation data:
the image processing apparatus performing image processing to print a color material of the first color based on the first quantization data and to print a color material of the second color based on the second quantization data,
wherein
the quantization processing unit,
in a case where a sum of the first gradation data and the second gradation data is equal to or smaller than the maximum value of the thresholds arrayed in the first threshold matrix,
generates the first quantization data based on a result of comparing the first gradation data with the first threshold and generates the second quantization data based on a result of comparing the second gradation data with the second threshold, and
in a case where the sum is greater than the maximum value, generates first overlapping gradation data and second overlapping gradation data by dividing a value that is obtained by subtracting the maximum value from the sum into two, generates the first quantization data based on a result of comparing the first overlapping gradation data with the second threshold or a result of comparing a difference between the first gradation data and the first overlapping gradation data with the first threshold, and generates the second quantization data based on a result of comparing the second overlapping gradation data with the first threshold or a result of comparing a difference between the second gradation data and the second overlapping gradation data with the second threshold.

2. The image processing apparatus according to claim 1, wherein a lightness of the first color is lower than a lightness of the second color.

3. The image processing apparatus according to claim 1, wherein either one of the first color and the second color is cyan and the other is magenta.

4. The image processing apparatus according to claim 1, wherein the first threshold matrix has blue noise characteristics.

5. The image processing apparatus according to claim 1, wherein
the second threshold for the processing-target pixel is obtained by subtracting the first threshold for the processing-target pixel from the maximum value of the thresholds arrayed in the first threshold matrix.

6. The image processing apparatus according to claim 1, further comprising:
a printing unit configured to print the color material of the first color based on the first quantization data and to print the color material of the second color based on the second quantization data.

7. An image processing method, comprising:
a gradation data obtaining step of obtaining first gradation data corresponding to a gradation value of a first color and second gradation data corresponding to a gradation value of a second color for a processing-target pixel;
a threshold obtaining step of obtaining a first threshold for the processing-target pixel from a first threshold matrix including a plurality of arrayed thresholds for pixels and obtain a second threshold for the processing-target pixel from a second threshold matrix in which the thresholds for the pixels are arrayed at such pixel positions that order of the pixel positions is inverse to order of pixel positions in the first threshold matrix in a case where the pixel positions are arranged in ascending order of the thresholds; and
a generating step of generating first quantization data and second quantization data that have a smaller number of gradations than the number of gradations of the first gradation data and the second gradation data based on the first threshold, the second threshold, the first gradation data, and the second gradation data:
the image processing method performing image processing for printing a color material of the first color based on the first quantization data and to print a color material of the second color based on the second quantization data,
wherein
in the generating step,
in a case where a sum of the first gradation data and the second gradation data is equal to or smaller than the maximum value of the thresholds arrayed in the first threshold matrix,
the first quantization data is generated based on a result of comparing the first gradation data with the first threshold and the second quantization data is generated based on a result of comparing the second gradation data with the second threshold, and
in the generating step,
in a case where the sum is greater than the maximum value,
first overlapping gradation data and second overlapping gradation data are generated by dividing a value that is obtained by subtracting the maximum value from the sum into two,
the first quantization data is generated based on a result of comparing the first overlapping gradation data with the second threshold or a result of comparing a difference between the first gradation data and the first overlapping gradation data with the first threshold, and
the second quantization data is generated based on a result of comparing the second overlapping gradation data with the first threshold or a result of comparing a difference between the second gradation data and the second overlapping gradation data with the second threshold.

8. An image processing apparatus, comprising:
one or more processors; and
one or more non-transitory computer-readable media storing computer-executable instructions that cause the one or more processors to function as:
a gradation data obtainment unit configured to obtain first gradation data corresponding to a gradation value of a first color and second gradation data corresponding to a gradation value of a second color for a processing-target pixel;
a threshold obtainment unit configured to obtain a first threshold for the processing-target pixel from a first threshold matrix including a plurality of arrayed thresholds for pixels and obtain a second threshold for the processing-target pixel from a second threshold matrix in which the thresholds for the pixels are arrayed at such pixel positions that order of the pixel positions is inverse to order of pixel positions in the first threshold matrix in a case where the pixel positions are arranged in ascending order of the thresholds; and
a quantization processing unit configured to quantize the first gradation data, and the second gradation data to generate first quantization data and second quantization data that have a smaller number of gradations than the number of gradations of the first gradation data and the second gradation data based on the first threshold, the second threshold, the first gradation data, and the second gradation data:
the image processing apparatus performing image processing to print a color material of the first color based on the first quantization data and to print a color material of the second color based on the second quantization data,
wherein
the quantization processing unit,
in a case where a sum of the first gradation data and the second gradation data is equal to or smaller than the maximum value of the thresholds arrayed in the first threshold matrix,
generates the first quantization data based on a result of comparing the first gradation data with the first threshold and generates the second quantization data based on a result of comparing the second gradation data with the second threshold, and in a case where the sum is greater than the maximum value,
generates a first correction amount and a second correction amount by dividing a value that is obtained by subtracting the maximum value from the sum into two,
generates the first quantization data by comparing the first gradation data with a value obtained by adding the first correction amount to the first threshold and
generates the second quantization data by comparing the second gradation data with a value obtained by adding the second correction amount to the second threshold.

9. The image processing apparatus according to claim 1, wherein
the first quantization data is binary data that determines whether or not to print the color material of the first color, and the second quantization data is binary data that determines whether or not to print the color material of the second color.

10. An image processing method, comprising:
a gradation data obtaining step of obtaining first gradation data corresponding to a gradation value of a first color and second gradation data corresponding to a gradation value of a second color for a processing-target pixel;
a threshold obtaining step of obtaining a first threshold for the processing-target pixel from a first threshold matrix including a plurality of arrayed thresholds for pixels and obtain a second threshold for the processing-target pixel from a second threshold matrix in which the thresholds for the pixels are arrayed at such pixel positions that order of the pixel positions is inverse to order of pixel positions in the first threshold matrix in a case where the pixel positions are arranged in ascending order of the thresholds; and
a generating step of generating first quantization data and second quantization data that have a smaller number of gradations than the number of gradations of the first gradation data and the second gradation data based on the first threshold, the second threshold, the first gradation data, and the second gradation data:
the image processing method further comprising an image processing step of printing a color material of the first color based on the first quantization data and to print a color material of the second color based on the second quantization data,
wherein
in the generating step,
in a case where a sum of the first gradation data and the second gradation data is equal to or smaller than the maximum value of the thresholds arrayed in the first threshold matrix, the first quantization data is generated based on a result of comparing the first gradation data with the first threshold and the second quantization data is generated based on a result of comparing the second gradation data with the second threshold, and
in a case where the sum is greater than the maximum value, a first correction amount and a second correction amount are generated by dividing a value that is obtained by subtracting the maximum value from the sum into two,
the first quantization data is generated by comparing the first gradation data with a value obtained by adding the first correction amount to the first threshold, and
the second quantization data is generated by comparing the second gradation data with a value obtained by adding the second correction amount to the second threshold.

11. An image processing apparatus, comprising:
one or more processors; and
one or more non-transitory computer-readable media storing computer-executable instructions that cause the one or more processors to function as:
a gradation data obtainment unit configured to obtain first gradation data corresponding to a gradation value of a first color and second gradation data corresponding to a gradation value of a second color for a processing-target pixel;
a threshold obtainment unit configured to obtain a first threshold for the processing-target pixel from a first threshold matrix including a plurality of arrayed thresholds for pixels and obtain a second threshold for the processing-target pixel from a second threshold matrix in which the thresholds for the pixels are arrayed at such pixel positions that order of the pixel positions is inverse to order of pixel positions in the first threshold matrix in a case where the pixel positions are arranged in ascending order of the thresholds; and
a quantization processing unit configured to quantize the first gradation data, and the second gradation data to generate first quantization data and second quantization data that have N gradations (N is an integer equal to or greater than 3), with N being smaller than the number of gradations of the first gradation data and the second gradation data, based on the first threshold, the second threshold, the first gradation data, and the second gradation data:
the image processing apparatus performing image processing to print a color material of the first color based on the first quantization data and to print a color material of the second color based on the second quantization data,
wherein
the quantization processing unit,
equally divides a gradation domain of the first gradation data and the second gradation data into (N−1) ranges to calculate a first intra-range gradation value that is a gradation value of the first gradation data in a range including the first gradation data and calculate a second intra-range gradation value that is a gradation value of the second gradation data in a range including the second gradation data, and
in a case where the range including the first gradation data and the range including the second gradation data are equal,
i) in a case where a sum of the first intra-range gradation value and the second intra-range gradation value is equal to or smaller than the maximum value of the thresholds arrayed in the first threshold matrix,
generates the first quantization data based on a result of comparing the first intra-range gradation value with the first threshold and generates the second quantization data based on a result of comparing the second intra-range gradation value with the second threshold, and
ii) in a case where the sum is greater than the maximum value,
generates first overlapping gradation data and second overlapping gradation data by dividing a value that is obtained by subtracting the maximum value from the sum into two,
generates the first quantization data based on a result of comparing the first overlapping gradation data with the second threshold or a result of comparing a difference between the first intra-range gradation value and the first overlapping gradation data with the first threshold, and generates the second quantization data based on a result of comparing the second overlapping gradation data with the first threshold or a result of comparing a difference between the second intra-range gradation value and the second overlapping gradation data with the second threshold.

12. The image processing apparatus according to claim 11, wherein
the quantization processing unit is configured to,
in a case where the range including the first gradation data is lower in gradation than the range including the second gradation data,
generates the first quantization data based on the result of comparing the first overlapping gradation data with the second threshold or the result of comparing a difference between the first intra-range gradation value and the first overlapping gradation data with the first threshold and generates the second quantization data based on the result of comparing the second intra-range gradation value with the second threshold, and
in a case where the range including the first gradation data is higher in gradation than the range including the second gradation data,
generates the first quantization data based on the result of comparing the first intra-range gradation value with the first threshold and generates the second quantization data based on the result of comparing the second overlapping gradation data with the first threshold or the result of comparing a difference between the second intra-range gradation value and the second overlapping gradation data with the second threshold.

13. The image processing apparatus according to claim 11, wherein
the quantization processing unit,
in a case where the range including the first gradation data is different from the range including the second gradation data, generates the first quantization data based on the result of comparing the first intra-range gradation value with the first threshold and generates the second quantization data based on the result of comparing the second intra-range gradation value with the second threshold.

14. The image processing apparatus according to claim 11, wherein
the quantization processing unit,
in a case where the first gradation data is included in an M-th range in ascending order of gradations in the (N−1) ranges, generates a level value (M−1) or a level value M as the first quantization data, and
in a case where the second gradation data is included in an L-th range in ascending order of gradations in the (N−1) ranges, generates a level value (L−1) or a level value L as the second quantization data.

15. An image processing method, comprising:
a gradation data obtaining step of obtaining first gradation data corresponding to a gradation value of a first color and second gradation data corresponding to a gradation value of a second color for a processing-target pixel;
a threshold obtaining step of obtaining a first threshold for the processing-target pixel from a first threshold matrix including a plurality of arrayed thresholds for pixels and obtain a second threshold for the processing-target pixel from a second threshold matrix in which the thresholds for the pixels are arrayed at such pixel positions that order of the pixel positions is inverse to order of pixel positions in the first threshold matrix in a case where the pixel positions are arranged in ascending order of the thresholds; and
a generating step of generating first quantization data and second quantization data that have N gradations (N is an integer equal to or greater than 3), with N being smaller than the number of gradations of the first gradation data and the second gradation data, based on the first threshold, the second threshold, the first gradation data, and the second gradation data:
the image processing method performing image processing for printing a color material of the first color based on the first quantization data and to print a color material of the second color based on the second quantization data,
wherein
in the generating step,
a gradation domain of the first gradation data and the second gradation data is equally divided into (N−1) ranges to calculate a first intra-range gradation value that is a gradation value of the first gradation data in a range including the first gradation data and calculate a second intra-range gradation value that is a gradation value of the second gradation data in a range including the second gradation data, and
in a case where the range including the first gradation data and the range including the second gradation data are equal,
i) in a case where a sum of the first intra-range gradation value and the second intra-range gradation value is equal to or smaller than the maximum value of the thresholds arrayed in the first threshold matrix,
the first quantization data is generated based on a result of comparing the first intra-range gradation value with the first threshold and the second quantization data is generated based on a result of comparing the second intra-range gradation value with the second threshold, and
ii) in a case where the sum is greater than the maximum value,
first overlapping gradation data and second overlapping gradation data are generated by dividing a value that is obtained by subtracting the maximum value from the sum into two,
the first quantization data is generated based on a result of comparing the first overlapping gradation data with the second threshold or a result of comparing a difference between the first intra-range gradation value and the first overlapping gradation data with the first threshold, and
the second quantization data is generated based on a result of comparing the second overlapping gradation data with the first threshold or a result of comparing a difference between the second intra-range gradation value and the second overlapping gradation data with the second threshold.

16. An image processing apparatus, comprising:
one or more processors; and
one or more non-transitory computer-readable media storing computer-executable instructions that cause the one or more processors to function as:
a gradation data obtainment unit configured to obtain first gradation data corresponding to a gradation value of a first color and second gradation data corresponding to a gradation value of a second color for a processing-target pixel;
a threshold obtainment unit configured to obtain a first threshold for the processing-target pixel from a first threshold matrix including a plurality of arrayed thresholds for pixels and obtain a second threshold for the processing-target pixel from a second threshold matrix in which the thresholds for the pixels are arrayed at such pixel positions that order of the pixel positions is inverse to order of pixel positions in the first threshold matrix in a case where the pixel positions are arranged in ascending order of the thresholds; and a quantization processing unit configured to quantize the first gradation data, and the second gradation data to generate first quantization data and second quantization data that have N gradations (N is an integer equal to or greater than 3), with N being smaller than the number of gradations of the first gradation data and the second gradation data, based on the first threshold, the second threshold, the first gradation data, and the second gradation data:

the image processing apparatus performing image processing to print a color material of the first color based on the first quantization data and to print a color material of the second color based on the second quantization data, wherein the quantization processing unit, equally divides a gradation domain of the first gradation data and the second gradation data into (N−1) ranges to calculate a first intra-range gradation value that is a gradation value of the first gradation data in a range including the first gradation data and calculate a second intra-range gradation value that is a gradation value of the second gradation data in a range including the second gradation data, and in a case where the range including the first gradation data and the range including the second gradation data are equal, i) in a case where a sum of the first intra-range gradation value and the second intra-range gradation value is equal to or smaller than the maximum value of the thresholds arrayed in the first threshold matrix, generates the first quantization data based on a result of comparing the first intra-range gradation value with the first threshold and generates the second quantization data based on a result of comparing the second intra-range gradation value with the second threshold, and ii) in a case where the sum is greater than the maximum value, generates a first threshold offset amount and a second threshold offset amount by dividing a value that is obtained by subtracting the maximum value from the sum into two, generates the first quantization data based on a result of comparing the first intra-range gradation value with a value obtained by adding the first threshold offset amount to the first threshold and generates the second quantization data based on a result of comparing the second intra-range gradation value with a value obtained by adding the second threshold offset amount to the second threshold.

17. The image processing apparatus according to claim 16, wherein the quantization processing unit, in a case where the range including the first gradation data is lower in gradation than the range including the second gradation data, generates the first quantization data based on a result of comparing the first intra-range gradation value with a sum of a value obtained by dividing the first intra-range gradation value into two and the first threshold and generates the second quantization data based on the result of comparing the second intra-range gradation value with the second threshold, and in a case where the range including the first gradation data is higher in gradation than the range including the second gradation data, generates the first quantization data based on the result of comparing the first intra-range gradation value with the first threshold and generates the second quantization data based on a result of comparing the second intra-range gradation value with a sum of a value obtained by dividing the second intra-range gradation value into two and the second threshold.

18. The image processing apparatus according to claim 16, wherein the generation quantization processing unit, in a case where the range including the first gradation data is different in gradation from the range including the second gradation data, generates the first quantization data based on the result of comparing the first intra-range gradation value with the first threshold and generates the second quantization data based on the result of comparing the second intra-range gradation value with the second threshold.

19. An image processing method, comprising:

a gradation data obtaining step of obtaining first gradation data corresponding to a gradation value of a first color and second gradation data corresponding to a gradation value of a second color for a processing-target pixel;

a threshold obtaining step of obtaining a first threshold for the processing-target pixel from a first threshold matrix including a plurality of arrayed thresholds for pixels and obtain a second threshold for the processing-target pixel from a second threshold matrix in which the thresholds for the pixels are arrayed at such pixel positions that order of the pixel positions is inverse to order of pixel positions in the first threshold matrix in a case where the pixel positions are arranged in ascending order of the thresholds; and a generating step of generating first quantization data and second quantization data that have N gradations (N is an integer equal to or greater than 3), with N being smaller than the number of gradations of the first gradation data and the second gradation data, based on the first threshold, the second threshold, the first gradation data, and the second gradation data:

the image processing method performing image processing for printing a color material of the first color based on the first quantization data and to print a color material of the second color based on the second quantization data, wherein in the generating step, a gradation domain of the first gradation data and the second gradation data is equally divided into (N−1) ranges to calculate a first intra-range gradation value that is a gradation value of the first gradation data in a range including the first gradation data and calculate a second intra-range gradation value that is a gradation value of the second gradation data in a range including the second gradation data, and in a case where the range including the first gradation data and the range including the second gradation data are equal, i) in a case where a sum of the first intra-range gradation value and the second intra-range gradation value is equal to or smaller than the maximum value of the thresholds arrayed in the first threshold matrix, the first quantization data is generated based on a result of comparing the first intra-range gradation value with the first threshold and the second quantization data is generated based on a result of comparing the second intra-range gradation value with the second threshold, and ii) in a case where the sum is greater than the maximum value, a first threshold offset amount and a second threshold offset amount are generated by dividing a value that is obtained by subtracting the maximum value from the sum into two, the first quantization data is generated based on a result of comparing the first intra-range gradation value with a value obtained by adding the first threshold offset amount to the first threshold, and the second quantization data is generated based on a result of comparing the second intra-range gradation value with a value obtained by adding the second threshold offset amount to the second threshold.

* * * * *